US012694886B2

(12) United States Patent
Nakahashi et al.

(10) Patent No.: US 12,694,886 B2
(45) Date of Patent: Jul. 28, 2026

(54) AREA REPRODUCTION SYSTEM AND AREA REPRODUCTION METHOD

(71) Applicant: Panasonic Intellectual Property Corporation of America, Torrance, CA (US)

(72) Inventors: Kota Nakahashi, Osaka (JP); Atsushi Sakaguchi, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 185 days.

(21) Appl. No.: 18/407,720

(22) Filed: Jan. 9, 2024

(65) Prior Publication Data

US 2024/0153519 A1 May 9, 2024

Related U.S. Application Data

(63) Continuation of application No. PCT/JP2022/018596, filed on Apr. 22, 2022.

(30) Foreign Application Priority Data

Jul. 14, 2021 (JP) ................................ 2021-116655

(51) Int. Cl.
*G10L 21/0208* (2013.01)
*G10K 11/175* (2006.01)
(Continued)

(52) U.S. Cl.
CPC ........ *G10L 21/0208* (2013.01); *G10L 21/028* (2013.01); *H04R 1/323* (2013.01);
(Continued)

(58) Field of Classification Search
CPC ............... G10L 21/0208; G10L 21/028; G10L 21/0216; G10L 2021/02166; H04R 1/02;
(Continued)

(56) References Cited

U.S. PATENT DOCUMENTS

| | | | | |
|---|---|---|---|---|
| 4,438,526 A * | 3/1984 | Thomalla | ................. | H04K 3/43 367/1 |
| 2009/0097669 A1 | 4/2009 | Kamiya | | |

(Continued)

FOREIGN PATENT DOCUMENTS

| | | |
|---|---|---|
| JP | 2009-94967 | 4/2009 |
| JP | 6718748 | 7/2020 |

(Continued)

OTHER PUBLICATIONS

International Search Report issued Jul. 26, 2022 in International (PCT) Application No. PCT/JP2022/018596.

*Primary Examiner* — Leshui Zhang
(74) *Attorney, Agent, or Firm* — Wenderoth, Lind & Ponack, L.L.P.

(57) ABSTRACT

An area reproduction system includes a speaker array with a plurality of speakers arranged side by side, receives an input of a reproduced sound, collects an environmental sound in a non-reproduction area different from a reproduction area in which a sound beam of the reproduced sound is emitted, acquires noise included in the environmental sound and a leakage sound leaking to the non-reproduction area, generates a masking sound having a sound pressure higher than that of the leakage sound based on the frequency characteristics of the sound pressures of the noise and the leakage sound, adjusts the directivity of the masking sound to be output from each of the plurality of speakers in such a manner that the sound beam of the masking sound is emitted to the non-reproduction area while avoiding a listener, and causes each of the plurality of speakers to output the adjusted masking sound.

12 Claims, 11 Drawing Sheets

(51) Int. Cl.
*G10L 21/028* (2013.01)
*H04R 1/32* (2006.01)
*H04S 7/00* (2006.01)

(52) U.S. Cl.
CPC ........ *H04S 7/303* (2013.01); *H04R 2201/401* (2013.01); *H04S 2400/15* (2013.01)

(58) Field of Classification Search
CPC . H04R 1/26; H04R 1/323; H04R 1/40; H04R 1/403; H04R 3/00; H04R 3/005; H04R 3/12; H04R 3/04; H04R 2201/401; H04R 5/02; H04S 7/30; H04S 7/302; H04S 7/303; H04S 2400/15; H04S 3/002; G10K 11/175; G10K 11/178; G10K 11/1754; G10K 11/1752; G10K 11/17881
USPC ........ 700/94; 381/73.1, 94.1, 94.2, 94.3, 95, 381/96, 97, 98, 99, 100, 101, 102, 103, 381/108, 111, 112, 113, 114, 115, 92, 77, 381/79, 81, 82, 83, 85, 86, 334, 71.1, 381/71.8, 71.11, 71.12
See application file for complete search history.

(56) References Cited

U.S. PATENT DOCUMENTS

| | | | | |
|---|---|---|---|---|
| 2013/0170655 | A1* | 7/2013 | Satoyoshi | H04K 3/84 381/59 |
| 2015/0208166 | A1 | 7/2015 | Raghuvanshi et al. | |
| 2017/0061952 | A1* | 3/2017 | Sakaguchi | G10K 11/17873 |
| 2017/0323629 | A1 | 11/2017 | Sakaguchi | |
| 2019/0130930 | A1* | 5/2019 | Tong | G10L 21/0208 |
| 2019/0230435 | A1* | 7/2019 | Maeno | H04S 7/303 |
| 2021/0241746 | A1* | 8/2021 | Osako | G10K 11/1752 |

FOREIGN PATENT DOCUMENTS

| | | | |
|---|---|---|---|
| KR | 10-2013-0042115 | 4/2013 | |
| WO | 2020/036058 | 2/2020 | |
| WO | WO-2020036058 A1 * | 2/2020 | G06V 40/10 |
| WO | 2021/014935 | 1/2021 | |

* cited by examiner

AREA REPRODUCTION SYSTEM AND AREA REPRODUCTION METHOD

TECHNICAL FIELD

The present disclosure relates to an area reproduction system and an area reproduction method.

BACKGROUND ART

Conventionally, an area reproduction technology has been known in which a sound is presented only at a specific position using a speaker array in which a plurality of speakers is arranged linearly, and different sounds are presented at different positions in the same space without interference. By using this technology, it is possible to present reproduced sounds of different content and volume to each user. However, in practice, a reproduced sound may leak to a position different from the position of the target of presentation.

Therefore, for example, Patent Literature 1 proposes measuring a noise level from an environmental sound in an environment where the speaker array is installed. Then, it is proposed that, in a case where the sound pressure of the reproduced sound reaching a non-reproduction line where sound waves emitted from the speaker array weaken each other exceeds the noise level, a masking sound is synthesized with the reproduced sound so that the masking sound reaching the non-reproduction line exceeds the sound pressure of the reproduced sound reaching the non-reproduction line.

However, the above-described conventional technique has a problem that the masking sound for masking the reproduced sound reaching the non-reproduction line is heard by the listener of the reproduced sound.

CITATION LIST

Patent Literature

Patent Literature 1: JP 6718748 B

SUMMARY OF INVENTION

The present disclosure has been made to solve the above problems, and an object thereof is to present an area reproduction system and an area reproduction method capable of preventing a masking sound for masking a reproduced sound leaking to a non-reproduction area from being heard by a listener of the reproduced sound.

An area reproduction system according to one aspect of the present disclosure includes a reproduction unit including a speaker array in which a plurality of speakers is arranged side by side, an audio input unit that receives an input of a reproduced sound to be listened by a listener, a sound collection unit that collects an environmental sound in a non-reproduction area different from a reproduction area in which a sound beam of the reproduced sound is emitted, an acquisition unit that acquires noise in the non-reproduction area included in the environmental sound and a leakage sound that is the reproduced sound leaking to the non-reproduction area, a generation unit that generates a masking sound having a sound pressure higher than a sound pressure of the leakage sound based on frequency characteristics of sound pressures of the noise and the leakage sound, and a directivity control unit that adjusts directivity of the masking sound to be output from each of the plurality of speakers in such a manner that a sound beam of the masking sound is emitted to the non-reproduction area while avoiding the listener, in which the reproduction unit causes each of the plurality of speakers to output the masking sound with adjusted directivity.

Figure 1:
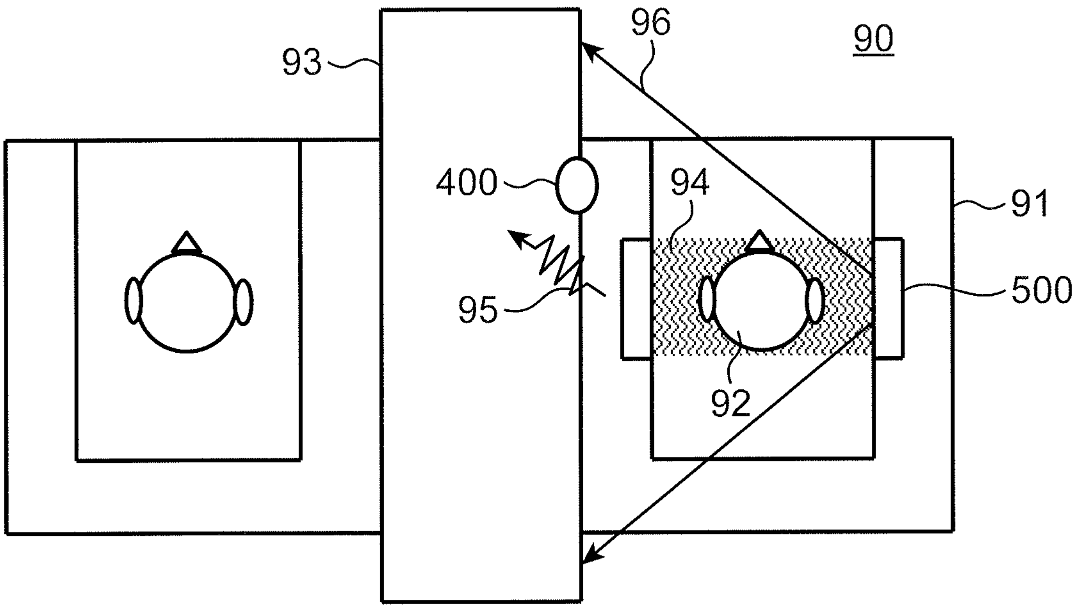
FIG. 1 is a diagram illustrating an example in an aircraft to which an area reproduction system according to an embodiment of the present disclosure is applied.

DESCRIPTION OF EMBODIMENTS (Knowledge Underlying the Present Disclosure)

In a case where the area reproduction technology as described above is actually used, it is important to make the listener certainly listen to the reproduced sound in a desired reproduction area. However, in a case where a large noise is generated in the surrounding environment, there is a problem that the reproduced sound is canceled by the noise and the listener cannot hear the reproduced sound. In order to solve this problem, it is conceivable to reproduce a reproduced sound with a larger volume so that the reproduced sound is not canceled out by the noise. However, when the volume of the reproduced sound is increased, there arises a problem that the reproduced sound leaks to a portion other than the reproduction line.

In order to solve this problem, Patent Literature 1 proposes synthesizing a masking sound with a reproduced sound so that a masking sound reaching the non-reproduction line exceeds a sound pressure of the reproduced sound reaching the non-reproduction line. Thus, the reproduced sound reaching the non-reproduction line is masked with the masking sound. However, this technique has a problem that a masking sound having a sound pressure exceeding the sound pressure of the reproduced sound leaks to the reproduction line, and the masking sound is heard by a listener of the reproduced sound.

In order to solve such a problem, an area reproduction system according to one aspect of the present disclosure includes a reproduction unit including a speaker array in which a plurality of speakers is arranged side by side, an audio input unit that receives an input of a reproduced sound to be listened by a listener, a sound collection unit that collects an environmental sound in a non-reproduction area different from a reproduction area in which a sound beam of the reproduced sound is emitted, an acquisition unit that acquires noise in the non-reproduction area included in the environmental sound and a leakage sound that is the reproduced sound leaking to the non-reproduction area, a generation unit that generates a masking sound having a sound pressure higher than a sound pressure of the leakage sound based on frequency characteristics of sound pressures of the noise and the leakage sound, and a directivity control unit that adjusts directivity of the masking sound to be output from each of the plurality of speakers in such a manner that a sound beam of the masking sound is emitted to the non-reproduction area while avoiding the listener, in which the reproduction unit causes each of the plurality of speakers to output the masking sound with adjusted directivity.

According to the present aspect, the directivity of the masking sound to be output from each of the plurality of speakers is adjusted in such a manner that the masking sound having a sound pressure higher than that of the leakage sound is generated and the sound beam of the masking sound is emitted to the non-reproduction area while avoiding the listener. Then, the masking sound with the adjusted directivity is output from each of the plurality of speakers.

Thus, the sound beam of the masking sound having a sound pressure higher than that of the leakage sound is emitted to the non-reproduction area while avoiding the listener of the reproduced sound. Therefore, the reproduced sound leaking to the non-reproduction area can be masked by the masking sound, and the masking sound can be avoided from being heard by the listener of the reproduced sound.

Further, in the above aspect, the generation unit may generate, as the masking sound, a sound obtained by adjusting a sound pressure of the noise or a sound acquired in advance to be higher than a sound pressure of the leakage sound at each of a plurality of frequencies.

According to the present aspect, the masking sound having a sound pressure higher than that of the leakage sound leaking to the non-reproduction area is generated at each of the plurality of frequencies using the noise in the non-reproduction area acquired from the environmental sound in the non-reproduction area or the sound acquired in advance. Therefore, in the non-reproduction area, it is possible to make it difficult to feel uncomfortable due to hearing a sound different from noise or a sound acquired in advance.

Further, in the above aspect, in a case where the sound pressure of the noise is equal to or lower than a predetermined lower limit level, the generation unit may stop generating the masking sound, and the reproduction unit stops outputting the masking sound.

According to the present aspect, it is possible to eliminate the sense of discomfort caused by hearing the masking sound in the silent non-reproduction area where only the noise equal to or lower than the lower limit level can be heard.

Further, in the above aspect, in a case where the reproduced sound is a recorded sound, the acquisition unit may acquire the noise and a predicted leakage sound that is the reproduced sound predicted to leak to the non-reproduction area after a predetermined time, and the generation unit may generate a sound having a sound pressure higher than a sound pressure of the predicted leakage sound as the masking sound to be output after the predetermined time based on frequency characteristics of sound pressures of the noise and the predicted leakage sound.

According to the present aspect, in a case where the reproduced sound is a recorded sound, a sound having a sound pressure higher than that of the predicted leakage sound can be generated in advance as the masking sound to be output after a predetermined time based on frequency characteristics of sound pressures of the predicted leakage sound predicted to leak to the non-reproduction area after the predetermined time and the noise in the non-reproduction area.

Therefore, after the predetermined time has elapsed from the reception of input of the reproduced sound in the audio input unit, the directivity of the masking sound generated in advance can be adjusted without applying a load of the processing of generating the masking sound, and the masking sound can be output.

Further, in the above aspect, when it is detected that a sudden sound in which a sound pressure instantaneously increases is included in the noise, the generation unit may remove the sudden sound from the noise, and then generate the masking sound based on frequency characteristics of sound pressures of the noise from which the sudden sound has been removed and the leakage sound.

According to the present aspect, generation of the masking sound including a sudden sound can be avoided based on the frequency characteristic of noise including the sudden sound. Thus, in the non-reproduction area, it is possible to eliminate the sense of discomfort caused by hearing the masking sound including the sudden sound.

Further, in the above aspect, the directivity control unit may adjust a width and an emitting direction of the sound beam in such a manner that the sound beam of the masking sound avoids a head position of the listener.

According to the present aspect, a width and an emitting direction of the sound beam are adjusted in such a manner that the sound beam of the masking sound avoids a head position of the listener. Therefore, it is possible to prevent the sound beam of the masking sound from being emitted to the ear of the listener. This makes it possible to avoid the masking sound from being heard by the listener.

Further, in the above aspect, a sensor that acquires information regarding a head position of the listener may be further included, in which the directivity control unit may specify the head position of the listener based on the information regarding the head position of the listener acquired by the sensor.

According to the present aspect, a head position of the listener is specified based on the information regarding the head position of the listener acquired by the sensor. Therefore, it is possible to appropriately avoid the sound beam of the masking sound from being emitted to the head position of the listener.

Further, in the above aspect, the directivity control unit may adjust the directivity of the masking sound in such a manner that a sound beam of the masking sound is emitted from a speaker farther from the listener as the speaker array is longer.

According to the present aspect, a sound beam of the masking sound is emitted from a speaker farther from the listener as the speaker array is longer. Therefore, in a case where the directivity of the masking sound is adjusted in such a manner that a sound beam of the masking sound is emitted to the non-reproduction area while avoiding the listener, the degree of adjustment can be reduced.

Further, in the above aspect, the acquisition unit may acquire, as the leakage sound, a sound obtained by convolving the reproduced sound received by the audio input unit with a predetermined transfer function of sound from an arrangement position of the reproduction unit to an arrangement position of the sound collection unit, and acquire, as the noise, a sound obtained by removing the acquired leakage sound from the environmental sound.

According to the present aspect, a sound obtained by convolving the reproduced sound to be listened by a listener with a transfer function of sound from an arrangement position of the reproduction unit to an arrangement position of the sound collection unit can be appropriately acquired as a leakage sound leaking to a non-reproduction area. Further, a sound obtained by removing the leakage sound from the environmental sound collected by the sound collection unit can be appropriately acquired as noise in the non-reproduction area included in the environmental sound. Thus, the masking sound can be appropriately generated based on the frequency characteristics of the sound pressures of the noise and the leakage sound.

Further, an area reproduction method according to another aspect of the present disclosure is an area reproduction method executed by a computer of an area reproduction system including a speaker array in which a plurality of speakers is arranged side by side, the area reproduction method including, by the computer, receiving an input of a reproduced sound to be listened by a listener, collecting an environmental sound in a non-reproduction area different from a reproduction area in which a sound beam of the reproduced sound is emitted, acquiring noise in the non-reproduction area included in the environmental sound and a leakage sound that is the reproduced sound leaking to the non-reproduction area, generating a masking sound having a sound pressure higher than a sound pressure of the leakage sound based on frequency characteristics of sound pressures of the noise and the leakage sound, adjusting directivity of the masking sound to be output from each of the plurality of speakers in such a manner that a sound beam of the masking sound is emitted to the non-reproduction area while avoiding the listener, and causing each of the plurality of speakers to output the masking sound with adjusted directivity.

The present configuration enables acquiring effects similar to those of the area reproduction system described above.

Note that each of the embodiments described below describes a specific example of the present disclosure. Numerical values, shapes, components, steps, order of steps, and the like shown in the embodiments below are merely examples, and are not intended to limit the present disclosure. A component that is not described in an independent claim representing the highest concept among components in the embodiments below is described as an arbitrary component. Further, in all the embodiments, content of each of the embodiments can be combined.

(Outline of System)

First, an outline of an area reproduction system according to an embodiment of the present disclosure will be described. The area reproduction system in the embodiment of the present disclosure can be applied in, for example, an aircraft, a train car, and the like. Hereinafter, an outline of an area reproduction system according to the embodiment of the present disclosure will be described with an example in which the area reproduction system is applied to an aircraft. FIG. 1 is a diagram illustrating an example in an aircraft 90 to which the area reproduction system according to the embodiment of the present disclosure is applied.

As illustrated in FIG. 1, in the present area reproduction system, an area 94 around a passenger 92 (listener) seated on a seat 91 in the aircraft 90 is set as a reproduction area, and area reproduction processing similar to the conventional area reproduction technology is performed. That is, a reproduced sound is processed so that sound waves of the reproduced sound intensify with each other in the reproduction area, and the processed reproduced sound is output by a plurality of speakers included in a reproduction unit 500. Thus, the sound beam of the reproduced sound is emitted to the reproduction area, and the sound waves of the reproduced sound are intensified in the reproduction area. As a result, the passenger 92 sitting on the seat 91 in the reproduction area can reliably listen to the reproduced sound.

However, in practice, the reproduced sound reaching the reproduction area may leak to an area (hereinafter, a non-reproduction area) different from the reproduction area such as a passage 93. Accordingly, in the area reproduction system, a sound collection unit 400 is disposed in the non-reproduction area, and a leakage sound 95, which is the reproduced sound leaked to the non-reproduction area, is acquired from the environmental sound collected by the sound collection unit 400.

Then, a masking sound 96 having a higher sound pressure than the leakage sound 95 in the non-reproduction area is generated, and the directivity of the masking sound 96 is adjusted in such a manner that the sound beam of the masking sound 96 is emitted to the non-reproduction area while avoiding the passenger 92. Then, the masking sound 96 whose directivity has been adjusted is output to the plurality of speakers included in the reproduction unit 500.

Thus, the sound beam of the masking sound 96 having a higher sound pressure than the leakage sound 95 is emitted to the non-reproduction area while avoiding the passenger 92. Therefore, the reproduced sound leaking to the non-reproduction area can be masked by the masking sound 96, and the masking sound 96 can be avoided from being heard by the passenger 92.

(Overall Image of System)

Figure 2:
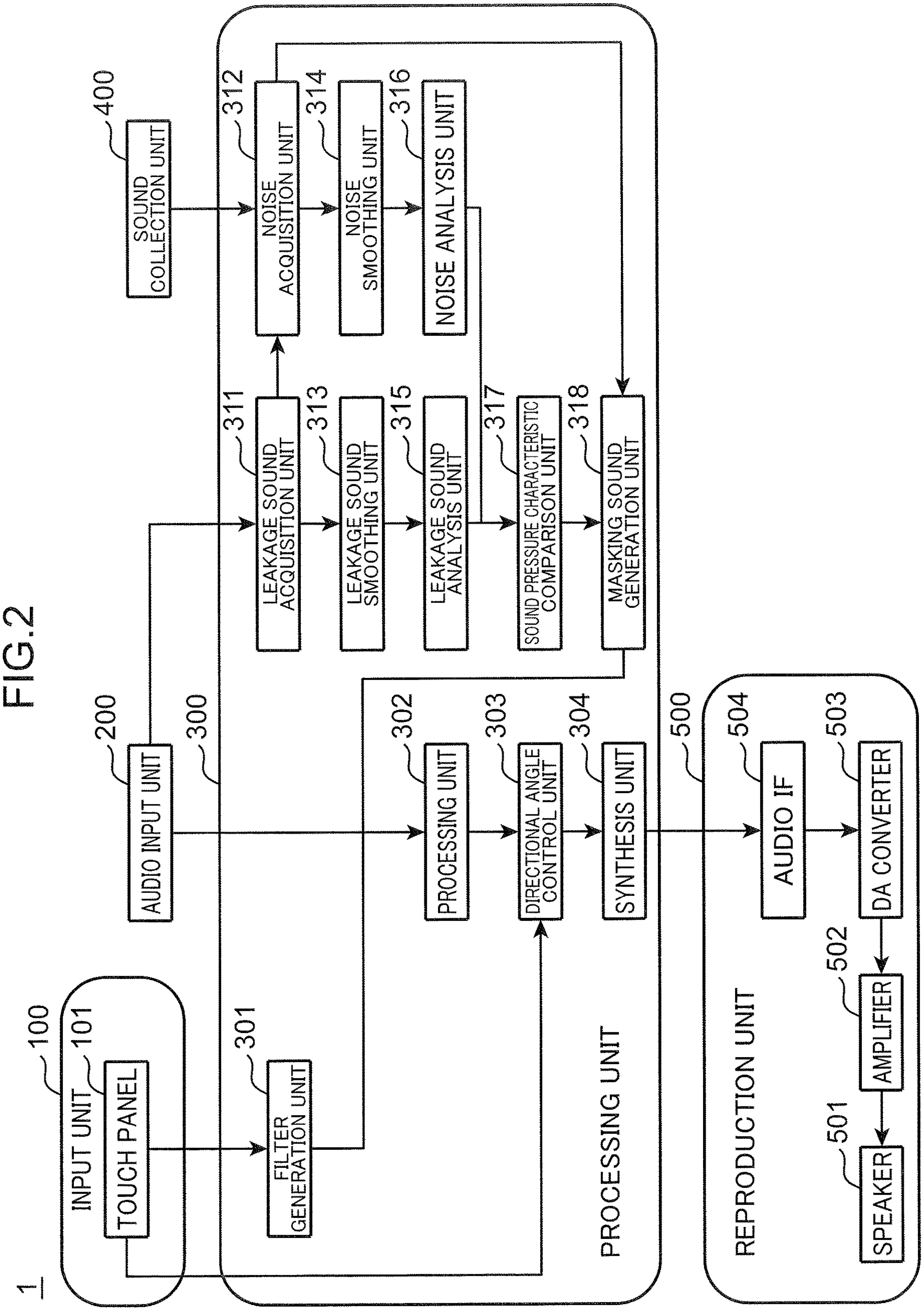
FIG. 2 is a diagram illustrating an example of a general configuration of the area reproduction system.

Next, an overall image of an area reproduction system 1 according to the embodiment of the present disclosure will be described. FIG. 2 is a diagram illustrating an example of a general configuration of the area reproduction system 1. As illustrated in FIG. 2, the area reproduction system 1 includes an input unit 100, an audio input unit 200, a processing unit 300, the sound collection unit 400, and the reproduction unit 500.

The input unit 100 is a terminal device including a touch panel 101 for performing various setting operations. Note that the input unit 100 is not limited to the touch panel 101, and may be a terminal device including a physical keyboard and mouse. Alternatively, the input unit 100 may be a terminal device including a user interface (UI) capable of performing the setting operation by a gesture.

In addition, the input unit 100 may be a terminal device such as a smartphone or a tablet used by the user of the area reproduction system 1. Alternatively, the input unit 100 may be a terminal device such as a personal computer shared by a plurality of users, provided in a room targeted for area reproduction by the area reproduction system 1.

The audio input unit 200 is an interface device that receives an input of an audio signal indicating a reproduced sound to be listened by a listener. The reproduced sound includes an unrecorded sound (live sound) and an environmental sound being collected by the microphone. Further, the reproduced sound includes a sound recorded on a storage medium such as a CD or a DVD being reproduced by an AV device.

The audio input unit 200 is communicably connected to an audio output device such as a microphone and an AV device and the processing unit 300 by a LAN, Bluetooth (registered trademark), an AV cable, or the like. The audio output device outputs, to the audio input unit 200, the audio signal indicating the reproduced sound to be listened by the listener. Upon receiving an input of the audio signal output from the audio output device, the audio input unit 200 outputs the audio signal to the processing unit 300. Note that the audio input unit 200 may be provided in the same device as the processing unit 300.

The processing unit 300 is an information processing device (computer) including a microprocessor, a ROM, a RAM, a hard disk drive, a keyboard, a mouse, a display unit, and the like. The processing unit 300 is communicably connected to an audio IF 504 described later by a LAN, Bluetooth (registered trademark), an AV cable, or the like. The processing unit 300 may be connectable to the Internet via a home gateway even if may not be connectable to the Internet by itself. Details of the processing unit 300 will be described later. Note that the processing unit 300 may be provided in the same device as the audio IF 504, and may be connected to the audio IF 504 by an AV cable or the like.

The sound collection unit 400 is a sound collection device such as a microphone. The sound collection unit 400 is communicably connected to the processing unit 300 by a LAN, Bluetooth (registered trademark), an AV cable, or the like. The sound collection unit 400 is arranged in the non-reproduction area and collects an environmental sound in the non-reproduction area. The sound collection unit 400 outputs an audio signal indicating a collected environmental sound (hereinafter, an environmental sound signal) in the non-reproduction area to the processing unit 300.

The reproduction unit 500 is an audio output device including an audio IF 504 that transmits and receives audio data, a DA converter 503 that converts the audio data input from the audio IF 504 into an analog signal, an amplifier 502 that amplifies the analog signal converted by the DA converter 503, speakers 501 that outputs sound indicated by the signal amplified by the amplifier 502, and the like.

Figure 5:
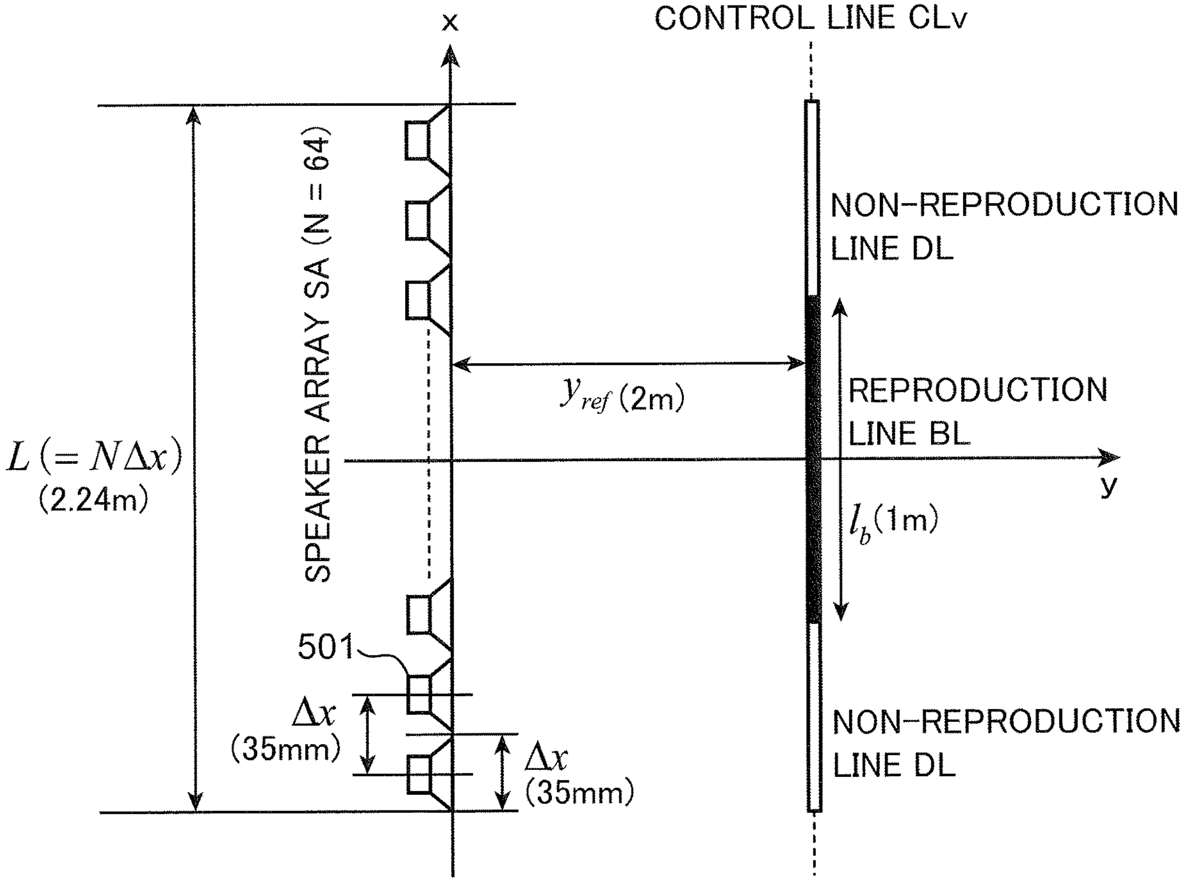
FIG. 5 is a diagram illustrating an example of setting of a reproduction line and a non-reproduction line.

The reproduction unit 500 includes a plurality of speakers 501, and the plurality of speakers 501 is arranged linearly at predetermined intervals to constitute a speaker array SA (FIG. 5). As will be described later, the performance of area reproduction varies depending on an arrangement interval $\Delta x$ of respective speakers 501, a length L of the speaker array SA in a longitudinal direction, and the like. Note that the type and scale of the speaker 501 are not limited. In addition, the speaker array SA may be constituted by arranging the plurality of speakers 501 in a curved manner on the same plane.

(Details of Processing Unit 300)

Next, the processing unit 300 will be described in detail. As illustrated in FIG. 2, the processing unit 300 includes a filter generation unit 301, a processing unit 302, a directional angle control unit 303, and a synthesis unit 304. The filter generation unit 301, the processing unit 302, and the directional angle control unit 303 constitute an example of a directivity control unit of the present disclosure.

The filter generation unit 301 generates a control filter for implementing a reproduction condition set by the user using the input unit 100. Further, the filter generation unit 301 generates a mask control filter for adjusting the directivity of the masking sound in such a manner that the sound beam of the masking sound is emitted to the non-reproduction area while avoiding the listener. Details of a method of generating the control filter and the mask control filter by the filter generation unit 301 will be described later.

The processing unit 302 performs processing of processing the reproduced sound to be output from the plurality of speakers 501 using the control filter generated by the filter generation unit 301 so that the reproduction condition designated by the user using the input unit 100 is implemented. Further, the processing unit 302 performs masking sound processing of processing the masking sound to be output to the plurality of speakers 501 using the mask control filter generated by the filter generation unit 301 so that the sound beam of the masking sound is emitted to the non-reproduction area while avoiding the listener.

Specifically, in the processing, the processing unit 302 generates, as a drive signal, a signal obtained by convolving the control filter generated by the filter generation unit 301 with an audio signal indicating a reproduced sound (hereinafter, a reproduced sound signal) input from the audio input unit 200, the drive signal being for causing each of the plurality of speakers 501 to output the reproduced sound.

Further, in the masking sound processing, the processing unit 302 generates, as a drive signal, a signal obtained by convoluting the mask control filter generated by the filter generation unit 301 with an audio signal indicating a masking sound (hereinafter, a masking sound signal) output by a masking sound generation unit 318 to be described later, the drive signal being for causing each of the plurality of speakers 501 to output the masking sound.

In a case where the reproduction condition designated by the user using the input unit 100 includes a deflection angle to be described later, the directional angle control unit 303 performs directional angle control processing of adjusting the phase of the reproduced sound to be output from each of the plurality of speakers 501 so that the emitting direction of the sound beam is deflected by the deflection angle. Further, the directional angle control unit 303 performs emission angle control processing of adjusting the phase of the masking sound to be output from each of the plurality of speakers 501 in such a manner that the sound beam of the masking sound is emitted to the non-reproduction area while avoiding the listener.

Specifically, in the directional angle control processing, the directional angle control unit 303 adjusts the phase of the drive signal of each speaker that outputs the reproduced sound generated by the processing unit 302. Thus, the directional angle control unit 303 adjusts the timing to start driving each speaker 501. In this manner, the directional angle control unit 303 adjusts the phase of the reproduced sound to be output from each of the plurality of speakers 501.

Similarly, in the emission angle control processing, the directional angle control unit 303 adjusts the phase of the drive signal of each speaker that outputs the masking sound generated by the processing unit 302. Thus, the directional angle control unit 303 adjusts the timing to start driving each speaker 501. In this manner, the directional angle control unit 303 adjusts the phase of the masking sound to be output from each of the plurality of speakers 501.

The directional angle control unit 303 outputs the drive signal after the phase adjustment to the synthesis unit 304. Details of a method of adjusting the phases of the reproduced sound and the masking sound by the directional angle control unit 303 will be described later. Note that, in a case where the reproduction condition designated by the user using the input unit 100 does not include the deflection angle, the directional angle control unit 303 outputs the drive signal generated by the processing unit 302 to the synthesis unit 304 as it is.

In a case where a drive signal for outputting each of a plurality of sounds is input, the synthesis unit 304 synthesizes a drive signal for outputting each of input sounds. The synthesis unit 304 transmits the synthesized drive signal to the reproduction unit 500 as a drive signal for causing the plurality of speakers 501 to output a synthesized sound obtained by synthesizing the plurality of sounds. Note that, in a case where a drive signal for outputting one reproduced sound is input from the directional angle control unit 303, the synthesis unit 304 transmits the input drive signal as it is to the reproduction unit 500.

The processing unit 300 further includes a leakage sound acquisition unit 311 (acquisition unit) related to generation of the masking sound, a noise acquisition unit 312 (acquisition unit), a leakage sound smoothing unit 313, a noise smoothing unit 314, a leakage sound analysis unit 315, a noise analysis unit 316, a sound pressure characteristic comparison unit 317, and the masking sound generation unit 318 (generation unit).

The leakage sound acquisition unit 311 acquires an audio signal (hereinafter, a leakage sound signal) indicating a reproduced sound leaking (hereinafter, a leakage sound) to the non-reproduction area. Specifically, the leakage sound acquisition unit 311 acquires, as the leakage sound signal, a signal obtained by convolving the reproduced sound signal input from the audio input unit 200 with a predetermined transfer function of sound from an arrangement position of the reproduction unit 500 to an arrangement position of the sound collection unit 400.

The noise acquisition unit 312 acquires an audio signal indicating noise (hereinafter, a noise signal) in the non-reproduction area included in the environmental sound signal input from the sound collection unit 400. Specifically, the noise acquisition unit 312 acquires the noise signal by subtracting (removing) the leakage sound signal acquired by the leakage sound acquisition unit 311 from the environmental sound signal.

The leakage sound smoothing unit 313 removes a sudden sound included in the leakage sound indicated by the leakage sound signal acquired by the leakage sound acquisition unit 311. The sudden sound indicates a sound in which the sound pressure instantaneously increases, such as an explosive sound or a collision sound. For example, the leakage sound smoothing unit 313 outputs an audio signal every predetermined time (for example, 1 second), the audio signal being obtained by averaging the sound pressures of leakage sounds indicated by the leakage sound signal acquired by the leakage sound acquisition unit 311 during the predetermined time.

Alternatively, when it is detected that the sound pressure of the leakage sound indicated by the leakage sound signal indicates a predetermined upper limit level, the leakage sound smoothing unit 313 may detect that the sudden sound is included in the leakage sound. In this case, the leakage sound smoothing unit 313 may remove the sudden sound from the leakage sound by reducing the sound pressure of the leakage sound indicated by the leakage sound signal to a predetermined sound pressure level equal to or lower than the upper limit level.

The noise smoothing unit 314 removes the sudden sound included in the noise indicated by the noise signal acquired by the noise acquisition unit 312. For example, the noise smoothing unit 314 outputs an audio signal every predetermined time (for example, 1 second), the audio signal obtained by averaging the sound pressures of noise indicated by the noise signal acquired by the noise acquisition unit 312 during the predetermined time.

Not limited to this, when it is detected that the sound pressure of the noise indicated by the noise signal indicates the predetermined upper limit level, the noise smoothing unit 314 may detect that the sudden sound is included in the noise. In this case, the noise smoothing unit 314 may remove the sudden sound from the noise by reducing the sound pressure of the noise indicated by the noise signal to a predetermined sound pressure level equal to or lower than the upper limit level.

The leakage sound analysis unit 315 performs frequency analysis of the leakage sound from which the sudden sound has been removed, indicated by the leakage sound signal output by the leakage sound smoothing unit 313. Specifically, the leakage sound analysis unit 315 derives the frequency characteristic of the sound pressure of the leakage sound leaking to the non-reproduction area by performing Fourier transform on the leakage sound signal output from the leakage sound smoothing unit 313.

The noise analysis unit 316 performs frequency analysis of the noise from which the sudden sound indicated by the noise signal output by the noise smoothing unit 314 has been removed. Specifically, the noise analysis unit 316 performs Fourier transform on the noise signal output from the noise smoothing unit 314 to derive the frequency characteristic of the sound pressure of the noise in the non-reproduction area.

The sound pressure characteristic comparison unit 317 compares the frequency characteristic of the sound pressure of the leakage sound leaking to the non-reproduction area derived by the leakage sound analysis unit 315 with the frequency characteristic of the sound pressure of the noise in the non-reproduction area derived by the noise analysis unit 316.

Specifically, the sound pressure characteristic comparison unit 317 compares the sound pressure of the noise in the non-reproduction area with the sound pressure of the leakage sound leaking to the non-reproduction area at each of the plurality of frequencies. Then, the sound pressure characteristic comparison unit 317 specifies a frequency at which the sound pressure of the leakage sound leaking to the non-reproduction area is higher than the sound pressure of the noise in the non-reproduction area (hereinafter, a target frequency), and a difference between the sound pressures of the noise and the sound pressure of the leakage sound at the target frequency (hereinafter, a sound pressure difference at the target frequency).

Figure 3:
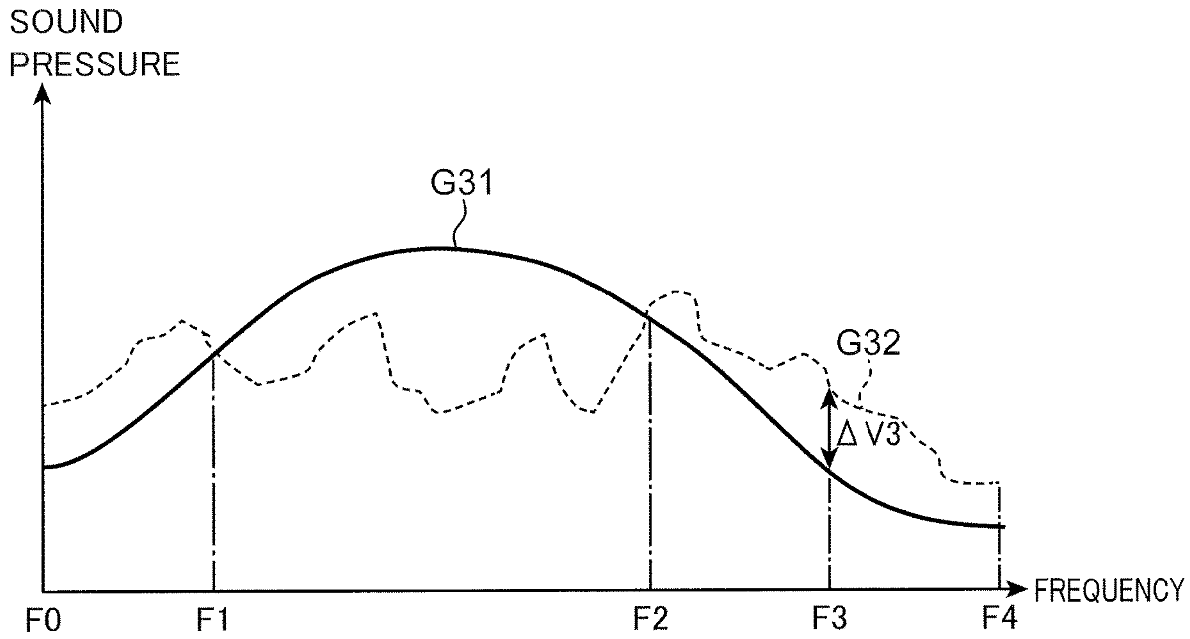
FIG. 3 is a graph illustrating an example of frequency characteristics of noise and a leakage sound.

FIG. 3 is a graph illustrating an example of frequency characteristics of noise and a leakage sound. The horizontal axis represents the frequencies of the noise and the leakage sound, and the vertical axis represents the sound pressures of the noise and the leakage sound. A graph G31 indicates frequency characteristic of the sound pressure of the noise in the non-reproduction area derived by the noise analysis unit 316. A graph G32 indicates frequency characteristics of the sound pressure of the leakage sound leaking to the non-reproduction area derived by the leakage sound analysis unit 315. In the example of FIG. 3, the sound pressure characteristic comparison unit 317 specifies frequencies included in the frequency band from a frequency F0 to a frequency F1 and the frequency band from a frequency F2 to a frequency F4 as target frequencies. Further, for example, the sound pressure characteristic comparison unit 317 specifies the difference AV3 between the sound pressure of the noise and the sound pressure of the leakage sound at the target frequency F3 as the sound pressure difference at the target frequency F3.

The masking sound generation unit 318 generates a masking sound signal indicating a masking sound having a sound pressure higher than that of the leakage sound based on the frequency characteristic of the sound pressure of the leakage sound leaking to the non-reproduction area derived by the leakage sound analysis unit 315, the frequency characteristic of the sound pressure of the noise in the non-reproduction area derived by the noise analysis unit 316, and the target frequency and the sound pressure difference at the target frequency that specified by the sound pressure characteristic comparison unit 317.

Specifically, the masking sound generation unit 318 receives the noise signal acquired by the noise acquisition unit 312. The masking sound generation unit 318 generates, as a masking sound signal, a signal in which the sound pressure of the target frequency specified by the sound pressure characteristic comparison unit 317 in the input noise signal is increased by equal to or more than the sound pressure difference at the target frequency specified by the sound pressure characteristic comparison unit 317.

Figure 4:
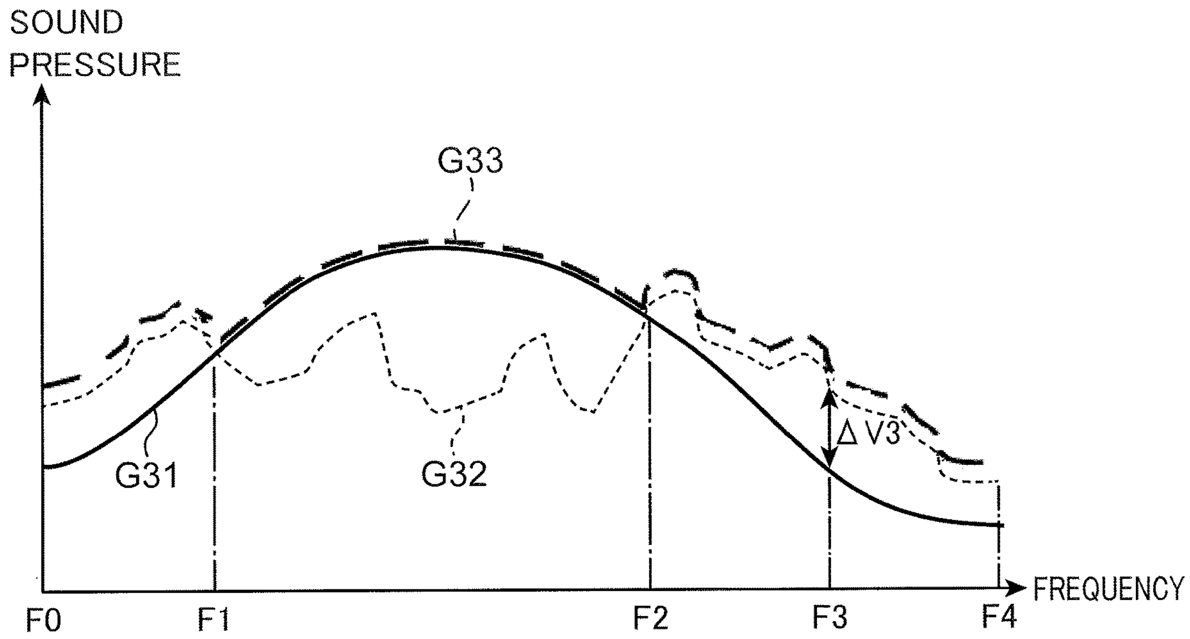
FIG. 4 is a graph illustrating an example of a frequency characteristic of a masking sound.

FIG. 4 is a graph illustrating an example of a frequency characteristic of a masking sound. The horizontal axis represents the frequencies of the noise and the leakage sound, and the vertical axis represents the sound pressures of the noise, the leakage sound, and the masking sound. A graph G31 illustrates frequency characteristics of the sound pressure of the noise illustrated in FIG. 3. A graph G32 illustrates frequency characteristics of the sound pressure of the leakage sound illustrated in FIG. 3. A graph G33 illustrates frequency characteristics of the masking sound generated based on the frequency characteristics of the sound pressures of the noise and the leakage sound illustrated in FIG. 3.

For example, based on the frequency characteristics of the sound pressures of the noise and the leakage sound indicated in the graphs G31 and G32, the masking sound generation unit 318 generates, as a masking sound signal, a signal in which the sound pressures of the target frequencies F0 to F1 and F2 to F4 in the noise signal input from the noise acquisition unit 312 are increased by equal to or more than a sound pressure difference at each target frequency specified by the sound pressure characteristic comparison unit 317 as indicated in the graph G33.

Note that the method by which the masking sound generation unit 318 generates the audio signal indicating the masking sound is not limited thereto. For example, the masking sound generation unit 318 may convert audio data stored (acquired) in advance in the hard disk drive or the like of the processing unit 300 into an analog signal. Then, the masking sound generation unit 318 may generate the masking sound signal using the analog signal instead of the noise signal acquired by the noise acquisition unit 312. That is, the masking sound generation unit 318 may generate, as the masking sound signal, a signal in which the sound pressure of each target frequency specified by the sound pressure characteristic comparison unit 317 in the analog signal is increased by equal to or more than the sound pressure difference at each target frequency specified by the sound pressure characteristic comparison unit 317.

Alternatively, the masking sound generation unit 318 may generate, as the masking sound signal, a signal obtained by uniformly increasing the sound pressure of each target frequency specified by the sound pressure characteristic comparison unit 317 in the noise signal input from the noise acquisition unit 312 or the audio data stored in advance in the processing unit 300 converted into the analog signal, by equal to or more than the maximum value of the sound pressure difference at the target frequency specified by the sound pressure characteristic comparison unit 317.

(Method of Generating Control Filter)

Next, details of a method of generating the control filter and the mask control filter by the filter generation unit 301 will be described. Note that the method of generating the mask control filter is similar to the method of generating the control filter. Therefore, only the details of the method of generating the control filter by the filter generation unit 301 will be described below, and the details of the method of generating the mask control filter will not be described.

Further, the plurality of speakers 501 included in the reproduction unit 500 is arranged on the x-axis to constitute a speaker array SA (FIG. 5). In the plane represented by the x-axis and the y-axis orthogonal to the x-axis, a sound pressure P(x, yref, ω) of the reproduced sound having an angular frequency ω that reaches a control point B(x, yref) among reproduced sounds having the angular frequency ω output from the speakers 501 at the position A(x0, 0) of the speaker array SA is given by the following Formula (1).

[Formula 1]

$$P(x, y_{ref}, \omega) = \int_{-\infty}^{\infty} D(x_0, 0, \omega) G(x - x_0, y_{ref}, \omega) \tag{1}$$

In Formula (1), D(x0, 0, ω) represents a drive signal of each speaker, and G(x−x0, yref, ω) represents a transfer function from each speaker 501 to the control point B(x, yref). Note that the transfer function G(x−x0, yref, ω) is a Green's function in a three-dimensional free space. Further, when the frequency of the reproduced sound is f, the angular frequency ω of the reproduced sound is expressed by 2πf (ω=2πf).

When Formula (1) is Fourier-transformed in the x-axis direction, the following Formula (2) is obtained from the convolution theorem.

[Formula 2]

$$\tilde{P}(k_x, y_{ref}, \omega) = \tilde{D}(k_x, \omega) \cdot \tilde{G}(k_x, y_{ref}, \omega) \tag{2}$$

Here, "~" indicates a value in the wave number region. kx is a spatial frequency in the x-axis direction. Furthermore, assuming that the reproduced sound signal to be output by the speaker 501 is S(ω) and the control filter is F(x0, 0, ω), the drive signal D(x0, 0, ω) of the speaker at the point A is expressed by the following Formula (3).

[Formula 3]

$$D(x_0, 0, \omega) = S(\omega) F(x_0, 0, \omega) \tag{3}$$

Since the control filter F(x0,0, ω) does not depend on the reproduced sound, S(ω)=1 is set hereinafter. Therefore, the following Formula (4) is obtained from the result of Fourier transforming Formula (3) in the x-axis direction and Formula (2).

[Formula 4]

$$\tilde{F}(k_x, \omega) = \frac{\tilde{P}(k_x, y_{ref}, \omega)}{\tilde{G}(k_x, y_{ref}, \omega)} \tag{4}$$

FIG. 5 is a diagram illustrating an example of setting of a reproduction line BL and a non-reproduction line DL. In order to implement the area reproduction, as illustrated in FIG. 5, the reproduction line BL in which sound waves emitted from the speaker array SA intensify each other and the non-reproduction line DL in which the sound waves weaken each other may be determined on a control line CL set at a position substantially parallel to the speaker array SA and separated from the speaker array SA by a distance yref. In the embodiment of the present disclosure, a length of the reproduction line BL in the x-axis direction (hereinafter, a width of the reproduction line BL) is lb. Then, the center of the reproduction line BL in the x-axis direction is set to x=0, and the sound pressure P(x, yref, ω) of the reproduced sound reaching the control point B(x, yref) on the control line CL is modeled as a rectangular wave expressed by the following Formula (5).

[Formula 5]

$$P(x, y_{ref}, \omega) = \begin{cases} 1, & \text{for } |x| \leq \frac{l_b}{2} \\ 0, & \text{otherwise} \end{cases} \quad (5)$$

Note that, in Formula (5), the sound pressure P(x, yref, ω) of the reproduced sound is modeled as "1" or "0". However, the present invention is not limited thereto, and the sound pressure P(x, yref, ω) of the reproduced sound may be modeled as a predetermined value of "1" or more (an example of the predetermined sound pressure) or "0".

A control filter F(x, 0, ω) that implements area reproduction can be analytically derived as in Formula (6) by substituting the sound pressure of the reproduced sound in the wave number region obtained by Fourier-transforming Formula (5) in the x-axis direction into Formula (4) and inversely Fourier-transforming the control filter in the wave number region obtained as a result.

[Formula 6]

$$F(x, 0, \omega) = F^{-1}\left[\frac{l_b \mathrm{sinc}(k_x l_b / 2\pi)}{\tilde{G}(k_x, y_{ref}, \omega)}\right] \quad (6)$$

Here, $F^{-1}$[ ] on the right side indicates the inverse Fourier transform, and a formula described in [ ] indicates the control filter in the wave number region.

However, Formula (6) is obtained on the assumption that the speakers 501 included in the speaker array SA are infinitely arranged on the x-axis. In practice, since the number of speakers 501 included in the speaker array SA is finite, the control filter F(x, 0, ω) needs to be discretized and derived.

Specifically, as illustrated in FIG. 5, the number of speakers 501 included in the speaker array SA is denoted by N, the arrangement interval of the respective speakers 501 is denoted by Δx, and the length of the speaker array SA in the x-axis direction is denoted by L. In this case, the discretized control filter F(x, 0, ω) can be analytically derived as in the following Formula (7) by performing discrete inverse Fourier transform on the control filter in the wave number region represented by the formula in [ ] on the right side of the Formula (6).

[Formula 7]

$$F(x, 0, \omega) = \frac{1}{L} \sum_{m=-N/2}^{N/2-1} \left(\frac{l_b \mathrm{sinc}(k_x l_b / 2\pi)}{\tilde{G}(k_x, y_{ref}, \omega)}\right) \exp\left(\frac{2\pi j n m}{N}\right) \quad (7)$$

-continued where $$x = n\Delta x(-N/2 \leqq n \leqq N/2 - 1),$$

$$L = N\Delta x,\ k_x = 2\pi m / N\Delta x$$

Therefore, the filter generation unit 301 generates the control filter F(x, 0, ω) by substituting 1) the arrangement interval Δx of the respective speakers 501, 2) the number N of speakers 501 included in the speaker array SA, 3) the distance yref from the speaker array SA to the control line CL in the y-axis direction, and 4) the width lb of the reproduction line BL in Formula (7).

(Method of Adjusting Phase of Reproduced Sound)

Next, details of a method of adjusting the phases of the reproduced sound and the masking sound by the directional angle control unit 303 will be described. Note that the method for adjusting the phase of the masking sound is similar to the method for adjusting the phase of the reproduced sound. Therefore, only the details of the method of adjusting the phase of the reproduced sound by the directional angle control unit 303 will be described below, and the details of the method of adjusting the phase of the masking sound will not be described.

Figure 6:
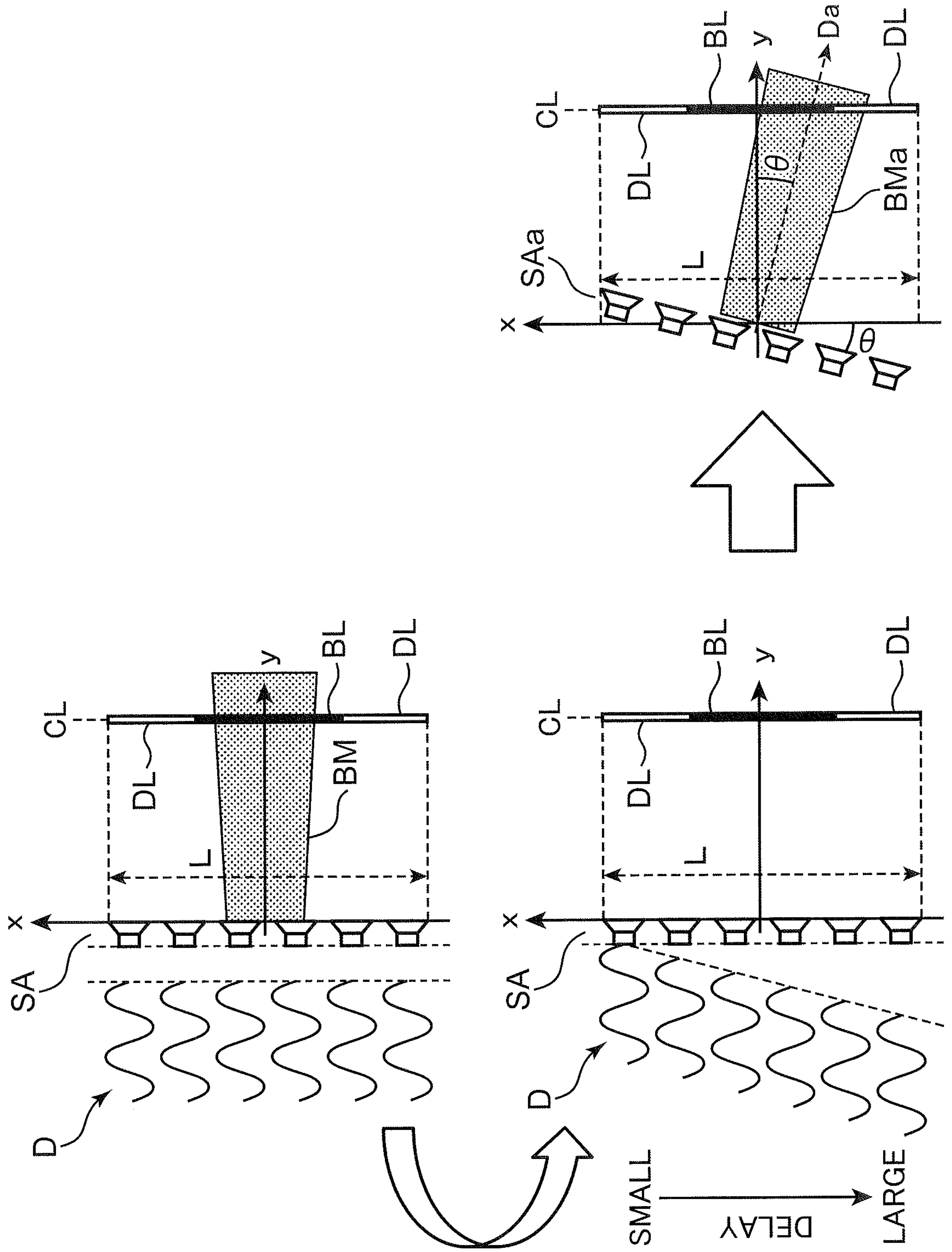
FIG. 6 is a diagram illustrating an example of adjustment for deflecting an emitting direction of the sound beam to a −x direction.

FIG. 6 is a diagram illustrating an example of adjustment for deflecting the emitting direction (hereinafter, the emitting direction) of the sound beam BM to the −x direction. The upper left of FIG. 6 illustrates an example in which the sound beam BM is emitted to the reproduction line BL. The lower left of FIG. 6 illustrates an example of adjusting the phase of the reproduced sound by the directional angle control unit 303. The lower right of FIG. 6 illustrates an example of a result of deflecting the emitting direction of the sound beam BM by adjusting the phase of the reproduced sound illustrated in the lower left of FIG. 6.

For example, as illustrated in the upper left of FIG. 6, it is assumed that the reproduction line BL is set so that the center of the speaker array SA in the x direction coincides with the center of the reproduction line BL in the x direction. Accordingly, it is assumed that a region different from the reproduction line BL is set as the non-reproduction line DL within a range facing the speaker array SA in the control line CL. Then, it is assumed that the control filter for implementing the area reproduction is generated by the filter generation unit 301 based on the setting. Further, it is assumed that a signal obtained by convoluting the control filter with the reproduced sound signal is generated as the drive signal D of the plurality of speakers 501 by the processing unit 302.

When the plurality of speakers 501 is driven by the drive signal D generated by the processing unit 302, as illustrated in the upper left of FIG. 6, the sound beam BM is emitted in the y direction, which is the front direction of the speaker array SA, and is emitted to the reproduction line BL.

Here, it is assumed that the emitting direction of the sound beam BM is deflected to the −x direction by an angle "θ". In this case, as illustrated in the lower left of FIG. 6, the directional angle control unit 303 adjusts the phase of the drive signal D so that the timing to start driving is delayed more greatly as the speaker 501 is closer to the end in the −x direction that is the direction in which the emitting direction of the sound beam BM is deflected (hereinafter, the deflection direction of the sound beam BM) in the speaker array SA.

When each of the plurality of speakers 501 is driven by the drive signal D with the adjusted phase, a sound beam BMa is emitted in a direction Da in which the deflection angle "θ" is formed in the −x direction with respect to the y direction, as illustrated in the lower right of FIG. 6. In other words, the sound beam BMa is emitted in the front direction from a speaker array SAa that is the speaker array SA inclined in the y direction by the deflection angle "θ". As a result, the sound beam BMa is also emitted to a position in the −x direction from one end in the −x direction of the reproduction line BL.

Figure 7:
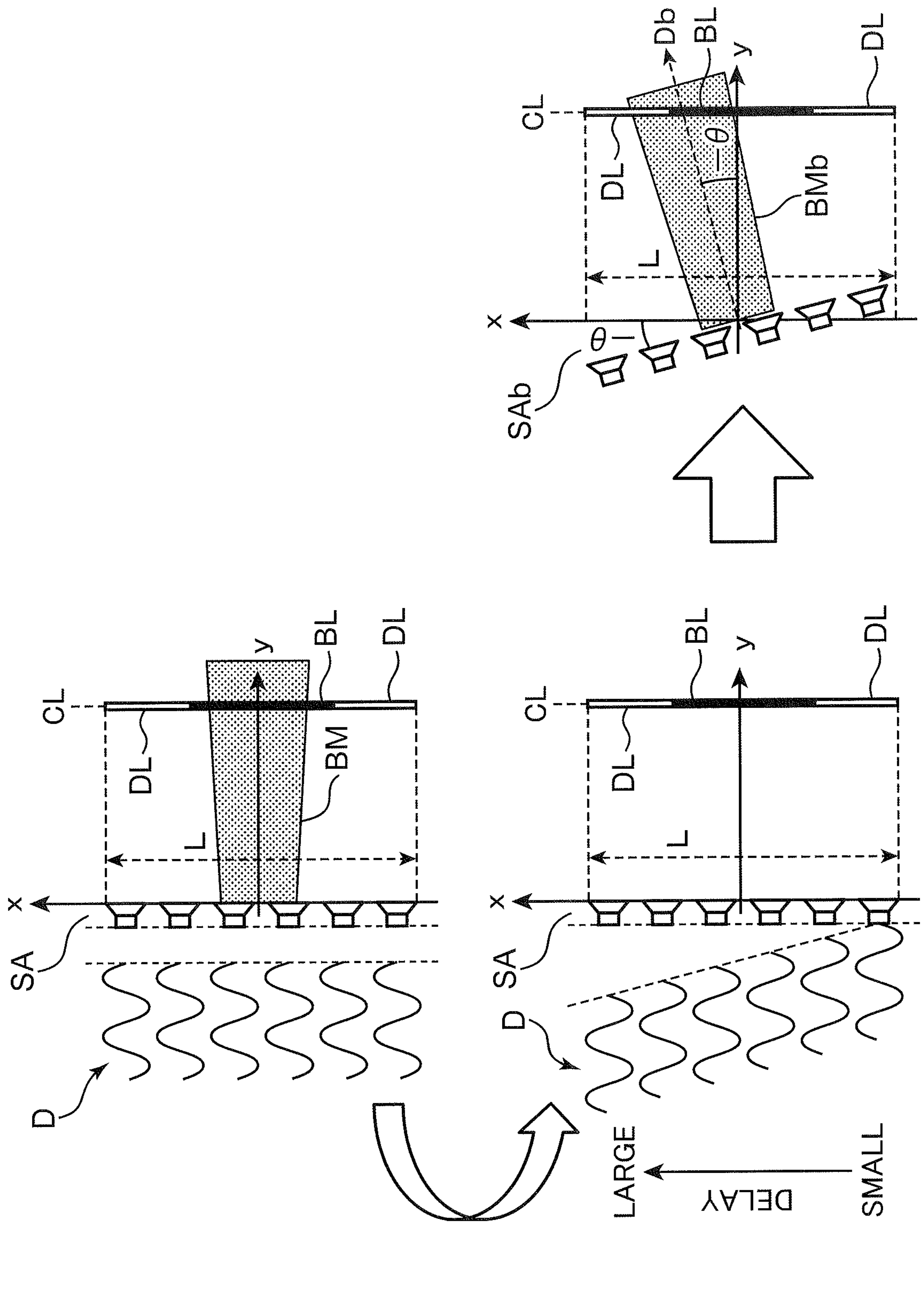
FIG. 7 is a diagram illustrating an example of adjustment for deflecting the emitting direction of the sound beam to the x direction.

FIG. 7 is a diagram illustrating an example of adjustment for deflecting the emitting direction of the sound beam BM to the x direction. The upper left of FIG. 7 is the same as the upper left of FIG. 6 and illustrates an example in which the sound beam BM is emitted in the y direction, which is the front direction of the speaker array SA, and is emitted to the reproduction line BL. The lower left of FIG. 7 illustrates another adjustment example of the phase of the reproduced sound by the directional angle control unit 303. The lower right of FIG. 7 illustrates an example of a result of deflecting the emitting direction of the sound beam BM by adjusting the phase of the reproduced sound illustrated in the lower left of FIG. 7.

It is assumed that the emitting direction of the sound beam BM is deflected to the x direction by an angle "θ". In this case, as illustrated in the lower left of FIG. 7, the directional angle control unit 303 adjusts the phase of the drive signal D so that the timing to start driving is greatly delayed as the speaker 501 is closer to the end in the x direction, which is the deflection direction of the sound beam BM, in the speaker array SA.

When each of the plurality of speakers 501 is driven by the drive signal D with the adjusted phase, a sound beam BMb is emitted in a direction in which the deflection angle "−θ" is formed in the −x direction with respect to the y direction (direction in which the angle "θ" is formed in the x direction) Db as illustrated in the lower right of FIG. 7. In other words, the sound beam BMb is emitted in the front direction from a speaker array SAb that is the speaker array SA inclined in the y direction by the deflection angle "−θ" (angle "θ" in the y direction). As a result, the sound beam BMb is also emitted to a position in the x direction from one end in the x direction of the reproduction line BL.

(Method of Calculating Delay Time)

The directional angle control unit 303 calculates a delay time τ, which is a time for delaying the start timing of driving between the two adjacent speakers 501, based on the deflection angle of the sound beam BM. A method of calculating the delay time τ will be described with reference to the specific example illustrated in FIG. 6. For example, as illustrated in FIG. 6, it is assumed that the emitting direction of the sound beam BM is deflected from the y direction to the direction Da in which the deflection angle "θ" is formed in the −x direction with respect to the y direction.

Figure 8:
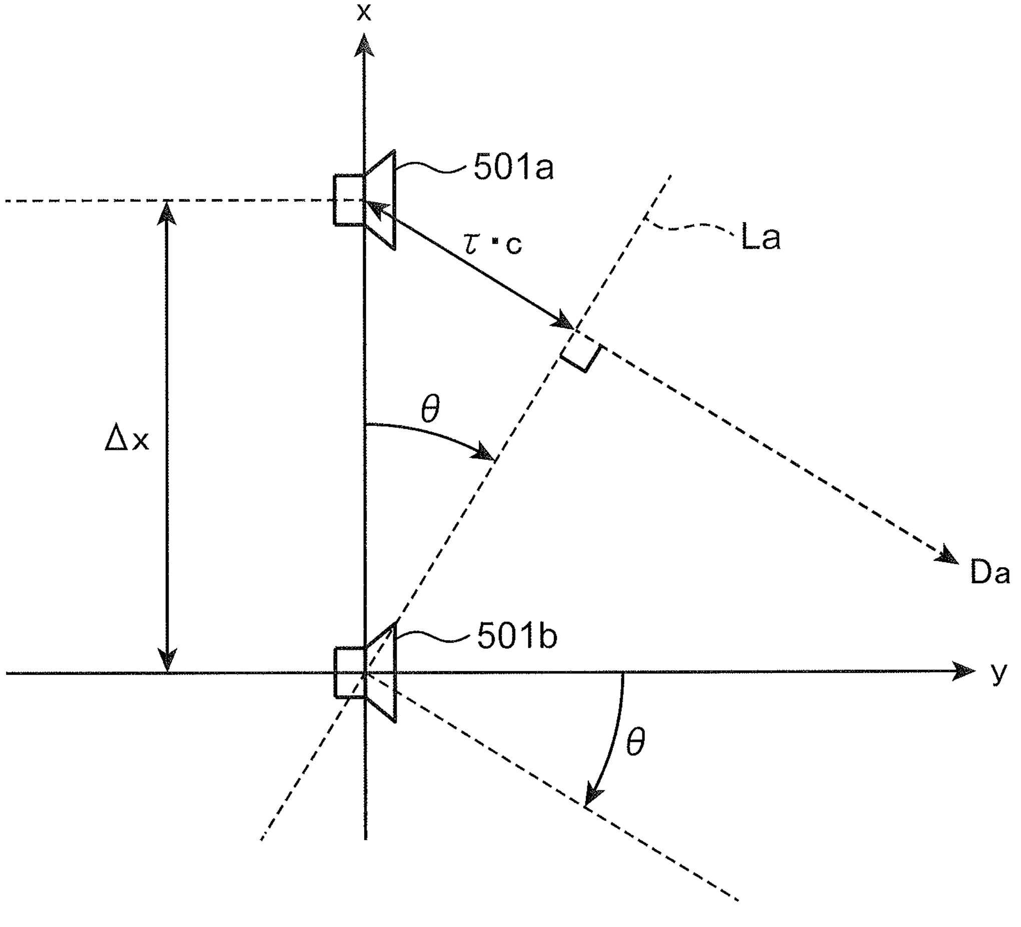
FIG. 8 is a diagram illustrating a relationship between a delay time and a deflection angle.

FIG. 8 is a diagram illustrating a relationship between the delay time τ and the deflection angle. In this case, as illustrated in FIG. 8, it is only necessary to start driving of the speaker 501*b* at a time point at which a sound wave at the sound velocity c output in the direction Da from a speaker 501*a* that started driving earlier out of two adjacent speakers 501*a* and 501*b* intersects a straight line La obtained by inclining the x-axis in the y direction by the deflection angle "θ". Thus, the sound waves intensify each other on the position parallel to the straight line La, and the sound beam BM is emitted in the direction Da orthogonal to the straight line La.

Here, the distance by which the sound wave output from the speaker 501*a* moves until intersecting the straight line La can be represented by the product of the arrangement interval Δx of the plurality of speakers 501 included in the speaker array SA and a sine function sin θ of the deflection angle θ or the product of the sound velocity c and the delay time τ. Thus, the directional angle control unit 303 calculates the delay time τ by using the following Formula (9) obtained by modifying the following Formula (8) indicating that the two products coincide with each other.

[Formula 8]

$$\Delta x \cdot \sin\theta = \tau \cdot c \tag{8}$$

[Formula 9]

$$\tau = (\Delta x \cdot \sin\theta)/c \tag{9}$$

That is, as illustrated in the lower left of FIG. 6, in a case where the emitting direction of the sound beam BM is deflected to the −x direction, the directional angle control unit 303 sets the center position in the x direction in the speaker array SA as the reference position, and delays the phase of the drive signal D of the speaker 501 arranged first in the −x direction from the reference position by the delay time τ.

Similarly, the directional angle control unit 303 delays the phase of the drive signal D of the speaker 501 arranged second in the −x direction from the reference position by a delay time 2τ. That is, the directional angle control unit 303 delays the phase of the drive signal D of the speaker 501 arranged m-th in the −x direction from the reference position by a delay time m·τ. On the contrary, the directional angle control unit 303 advances the phase of the drive signal D of the speaker 501 arranged m-th in the x direction from the reference position by the delay time m·τ.

On the other hand, in a case the emitting direction of the sound beam BM is deflected to the x direction, as illustrated in the lower left of FIG. 7, the directional angle control unit 303 delays the phase of the drive signal D of the speaker 501 arranged first in the x direction from the reference position by the delay time τ.

Similarly, the directional angle control unit 303 delays the phase of the drive signal D of the speaker 501 arranged second in the x direction from the reference position by the delay time 2τ. That is, the directional angle control unit 303 delays the phase of the drive signal D of the speaker 501 arranged m-th in the x direction from the reference position by the delay time m·τ. On the contrary, the directional angle control unit 303 advances the phase of the drive signal D of the speaker 501 arranged m-th in the −x direction from the reference position by the delay time m·τ.

(Operation of Area Reproduction)

Figure 9:
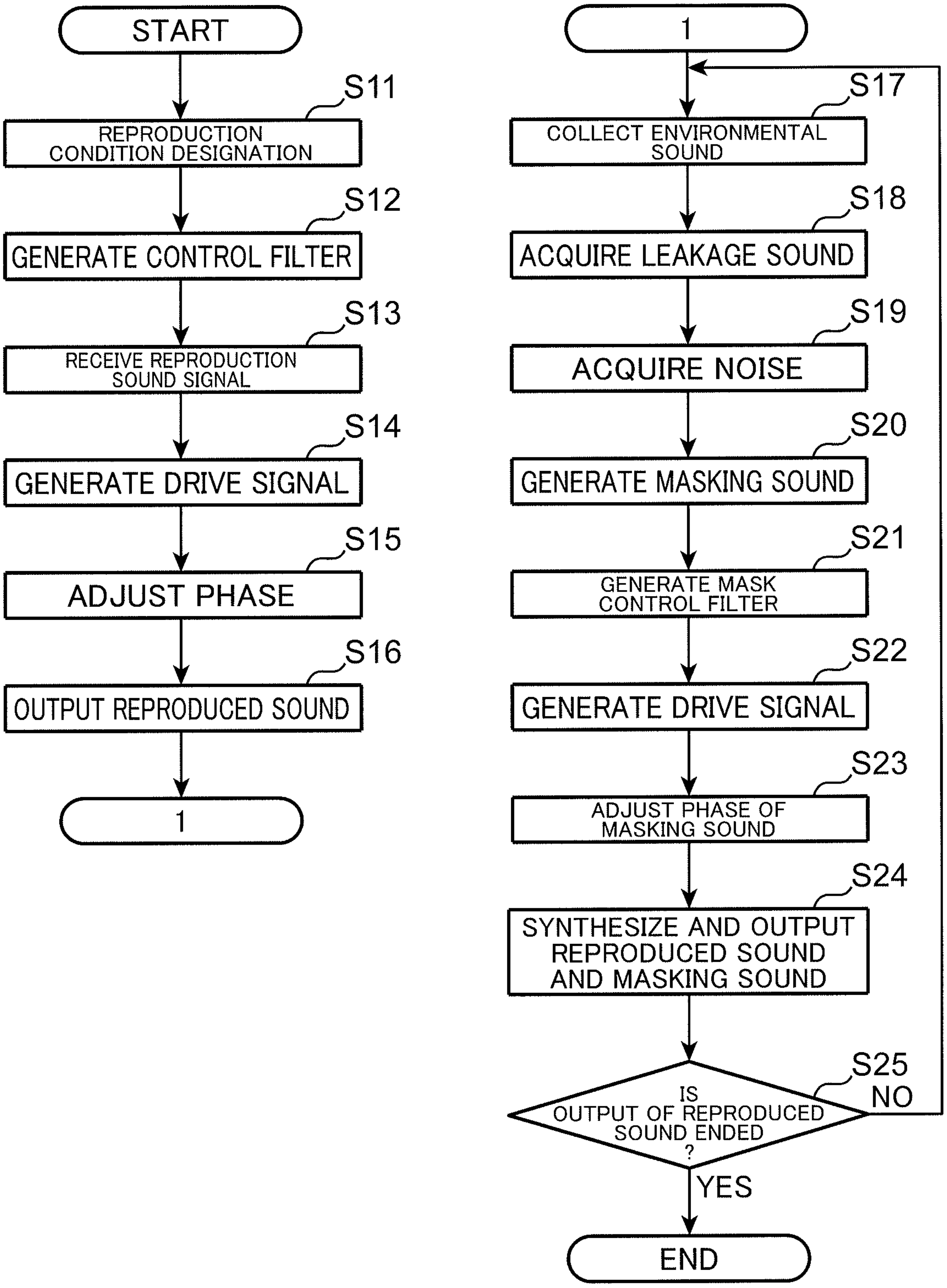
FIG. 9 is a flowchart illustrating an example of an operation of area reproduction.
Figure 10:
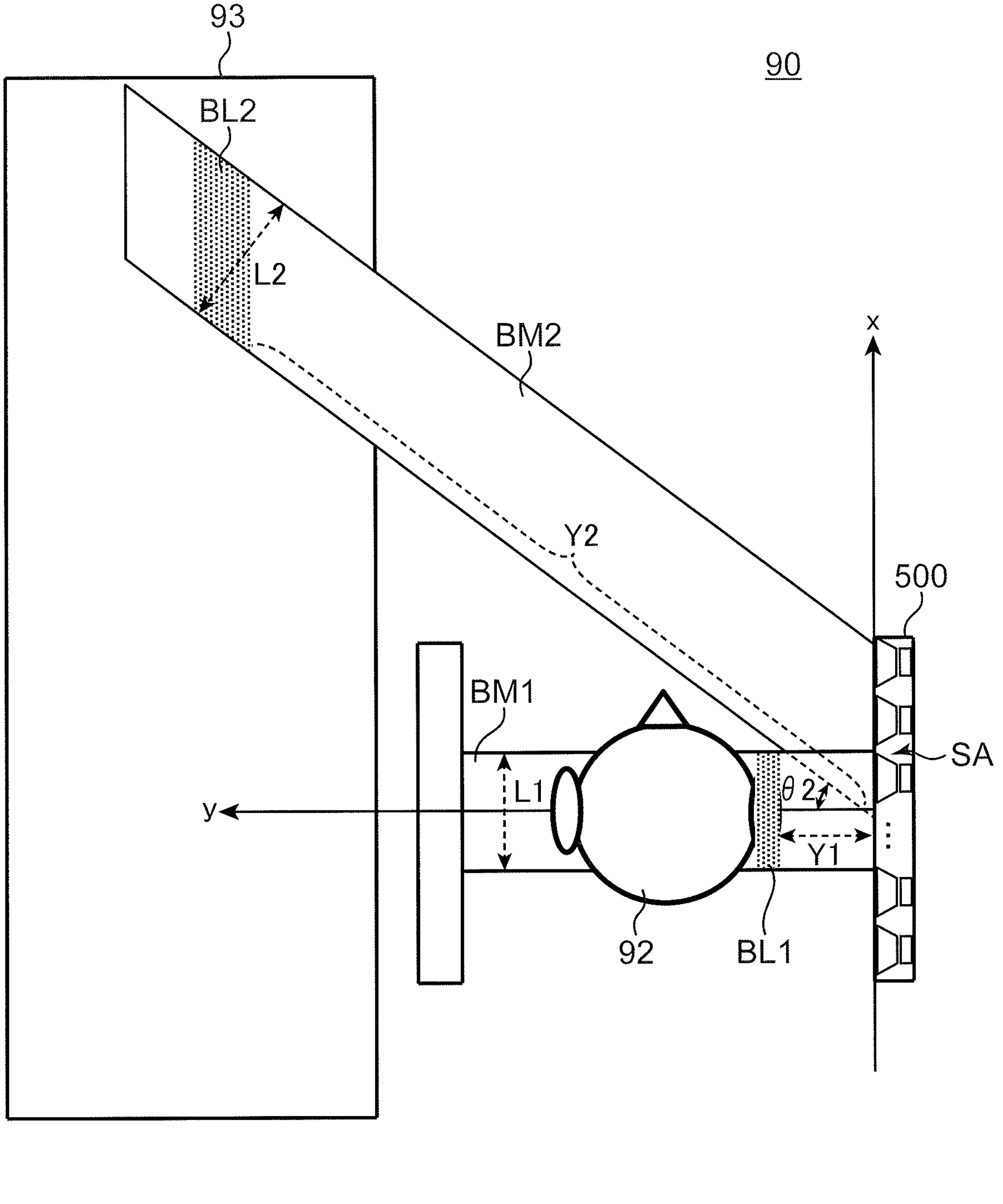
FIG. 10 is a diagram illustrating an adjustment example of directivity of a reproduced sound and a masking sound.

Next, an area reproduction method executed in the area reproduction system 1 will be described by exemplifying a case where the area reproduction system 1 is applied in the aircraft 90 as illustrated in FIG. 1. FIG. 9 is a flowchart illustrating an example of an operation of area reproduction. FIG. 10 is a diagram illustrating an adjustment example of the directivity of the reproduced sound and the masking sound.

First, when the reproduction condition of the reproduced sound is designated by the user using the touch panel 101, the input unit 100 transmits the reproduction condition to the processing unit 300 (step S11).

The reproduction conditions designated in step S11 include the conditions of 1) the arrangement interval Δx of the respective speakers 501, 2) the number N of speakers 501 included in the speaker array SA, 3) the distance yref from the speaker array SA to the control line CL in the y-axis direction, and 4) the width lb of the reproduction line BL, which are necessary for generating the control filter F(x, 0, ω). Further, the reproduction conditions designated in step S11 include conditions such as 5) the volume of the reproduced sound on the reproduction line BL and 6) the deflection angle for deflecting the emitting direction of the sound beam BM. Note that the reproduction conditions may not include some or all of the conditions 1) to 6) above.

For example, in a case where the area reproduction system 1 is used in the aircraft 90, it is sufficient if a side surface (an example of the head position) of the head of the passenger 92 near the speaker array SA is used as a reproduction line BL1 as illustrated in FIG. 10. Therefore, in step S11, it is sufficient if a distance Y1 in the y-axis direction from the speaker array SA to the reproduction line BL1 is designated as the condition of 3), and the width L1 of the reproduction line BL1 is designated as the condition of 4).

In addition, in this example, since it is not necessary to deflect a sound beam BM1 of the reproduced sound emitted from the speaker array SA toward the reproduction line, the deflection angle for deflecting the emitting direction of the sound beam BM1, which is the condition of 6), may not be designated. Alternatively, 0° may be designated as the deflection angle for deflecting the emitting direction of the sound beam BM1, which is the condition of 6).

The filter generation unit 301 acquires the reproduction condition transmitted in step S11, and performs calculation of substituting the above conditions 1) to 4) included in the reproduction condition into Formula (7). Thus, the filter generation unit 301 generates the control filter F(x, 0, ω) for implementing area reproduction under the reproduction conditions (step S12).

Note that the reproduction conditions may not include some or all of the conditions 1) to 4) above. In a case where the conditions 1) and 2) above are not included in the reproduction conditions, the filter generation unit 301 acquires the arrangement interval Δx of the respective speakers 501 and the number N of speakers 501 included in the speaker array SA, which are stored in advance in the ROM or the like, and uses these as the conditions 1) and 2) above.

In a case where the above condition 3) is not included in the reproduction condition, the filter generation unit 301 acquires information indicating the head position of the listener detected by a predetermined sensor disposed in the area reproduction system 1. The filter generation unit 301 sets the above condition 3) for setting the control line CL based on the acquired information regarding the head position of the listener.

Specifically, the predetermined sensor includes, for example, a camera, a depth sensor, and the like. The predetermined sensor may be incorporated in the same device as the reproduction unit 500 or may be provided outside the reproduction unit 500. The predetermined sensor only needs to be able to transmit an output signal to the processing unit 300.

For example, it is assumed that a camera (not illustrated) that captures an image in the y-axis direction is provided on the same x-axis as the speaker array SA as the predetermined sensor. In this case, the filter generation unit 301 acquires the captured image (information indicating the head position of the listener) output from the camera, and recognizes whether or not the head of the person is included in the captured image using a known image recognition technology or the like. Then, when recognizing that the head of the person is included in the captured image, the filter generation unit 301 calculates the distance in the y-axis direction from the x-axis to the head position of the person based on the ratio between the size of the image indicating the head of the recognized person and the size of the captured image, and the like.

Alternatively, it is assumed that, as the predetermined sensor, there is provided a depth sensor capable of measuring a distance in the y-axis direction from the x-axis to the head position of the person and outputting a signal indicating the measured distance (information indicating the head position of the listener) to the processing unit 300. In this case, the filter generation unit 301 acquires the distance in the y-axis direction from the x-axis to the head position of the person indicated by an output signal of the sensor.

Then, the filter generation unit 301 specifies the distance in the y-axis direction from the x-axis to the head position of the person as the distance in the y-axis direction from the x-axis to the head position of the listener. Then, the filter generation unit 301 sets the distance in the y-axis direction from the specified x-axis to the head position of the listener as the above condition 3) (the distance yref from the speaker array SA to the control line CL in the y-axis direction).

Further, in a case where the reproduction condition acquired in step S11 does not include the above condition 4), the filter generation unit 301 acquires a predetermined fixed value (for example, 30 cm), for example, about the width of the side surface of the head of the person stored in advance in the ROM or the like, and sets the fixed value as the above condition 4) (the width lb of the reproduction line BL).

As described above, the filter generation unit 301 can automatically set the conditions 1) to 4) based on the information regarding the head position of the listener acquired from the predetermined sensor without causing the user to take time and effort to designate the conditions 1) to 4) necessary for setting the control line CL. Thus, the filter generation unit 301 can automatically set the control line CL.

Note that it is assumed that the reproduction condition includes the above condition 5) (the volume of the reproduced sound on the reproduction line BL). In this case, the filter generation unit 301 generates, as the control filter F(x, 0, ω), a result r·F(x, 0, ω) obtained by multiplying the control filter F(x, 0, ω) calculated using the above conditions 1) to 4) by the ratio r (=volume of reproduced sound/maximum volume) of the volume of the reproduced sound indicated by the condition 5) with respect to the predetermined maximum volume.

Next, upon receiving an input of the reproduced sound signal indicating a reproduced sound to be listened by the passenger 92 who is a listener, the audio input unit 200 outputs the reproduced sound signal to the processing unit 300 (step S13).

The processing unit 302 performs processing using the reproduced sound signal output in step S13. Specifically, in the processing, the processing unit 302 generates the drive signal D by convolving the reproduced sound signal output in step S13 with the control filter F(x, 0, ω) generated in step S12 (step S14).

More specifically, in step S14, the processing unit 302 generates the drive signal D(x, 0,2πf)(D(x, 0,2πf)=S(2πf)F(x, 0,2πf)) obtained by convoluting the control filter F(x, 0,2πf) generated in step S12 with an audio signal S(2πf) indicating the reproduced sound.

Next, in a case where the deflection angle is included in the reproduction condition designated in step S11, the directional angle control unit 303 performs the directional angle control processing. Specifically, in the directional angle control processing, the directional angle control unit 303 adjusts the phase of the reproduced sound to be output from each of the plurality of speakers 501 so that the emitting direction of the sound beam of the reproduced sound is deflected by the deflection angle (step S15). Note that, in a case where the reproduction condition does not include the deflection angle, step S16 is performed.

More specifically, in step S15, the directional angle control unit 303 adjusts the timing to start driving each speaker 501 by adjusting the phase of the drive signal D(x, 0,2πf) generated in step S14 as described above. Thus, the directional angle control unit 303 adjusts the phase of the reproduced sound to be output from each of the plurality of speakers 501.

Next, the synthesis unit 304 transmits the drive signal D, which is generated in step S14 and whose phase has been adjusted in step S15 or whose phase has not been adjusted in step S15, as it is to the reproduction unit 500. In response to this, the reproduction unit 500 drives each of the plurality of speakers 501 by the received drive signal D. Thus, the reproduction unit 500 causes each of the plurality of speakers 501 to output the reproduced sound indicated by the reproduced sound signal received in step S13 (step S16).

Next, the sound collection unit 400 collects the environmental sound and outputs an environmental sound signal indicating the collected environmental sound to the processing unit 300 (step S17). The leakage sound acquisition unit 311 acquires the leakage sound signal indicating the leakage sound leaking to the non-reproduction area (step S18). The noise acquisition unit 312 acquires the noise signal indicating the noise in the non-reproduction area included in the environmental sound signal output in step S17 (step S19).

Next, the processing unit 300 generates the masking sound signal indicating the masking sound having a sound pressure higher than that of the leakage sound based on the frequency characteristics of the sound pressures of the noise in the non-reproduction area indicated by the noise signal acquired in step S19 and the leakage sound indicated by the leakage sound signal acquired in step S18 (step S20).

Specifically, in step S20, the noise smoothing unit 314 removes a sudden sound included in the noise indicated by the noise signal. The noise analysis unit 316 performs frequency analysis on the noise, from which the sudden sound has been removed, indicated by the noise signal output by the noise smoothing unit 314, and derives the frequency characteristic of the sound pressure of the noise in the non-reproduction area. Similarly, the leakage sound smoothing unit 313 removes a sudden sound included in the leakage sound indicated by the leakage sound signal. The leakage sound analysis unit 315 performs frequency analysis of the leakage sound from which the sudden sound has been removed, indicated by the leakage sound signal output by the leakage sound smoothing unit 313, and derives the frequency characteristic of the sound pressure of the leakage sound leaking to the non-reproduction area.

The sound pressure characteristic comparison unit 317 compares the derived frequency characteristics of the sound pressures of the noise and the leakage sound, and specifies a target frequency and a sound pressure difference at the target frequency. The masking sound generation unit 318 generates an audio signal indicating a masking sound having a sound pressure higher than that of the leakage sound based on the frequency characteristic of the sound pressure of the leakage sound leaking to the non-reproduction area, the frequency characteristic of the sound pressure of the noise in the non-reproduction area, the target frequency, and the sound pressure difference at the target frequency.

Next, the filter generation unit 301 generates the mask control filter F(x, 0, ω) for adjusting the directivity of the masking sound in such a manner that the sound beam of the masking sound is emitted to the non-reproduction area avoiding the listener (step S21).

Specifically, in step S21, as illustrated in FIG. 10, the filter generation unit 301 generates the mask control filter F(x, 0, ω) for adjusting the directivity of the masking sound in such a manner that a sound beam BM2 of the masking sound is emitted to the reproduction line BL2 in the passage 93 which is the non-reproduction area while avoiding the reproduction line BL1 set at the head position of the passenger 92 who is the listener.

More specifically, in step S21, the filter generation unit 301 acquires the arrangement interval Δx of the respective speakers 501 and the number N of speakers 501 included in the speaker array SA, which are stored in advance in the ROM or the like. The filter generation unit 301 sets them as the above condition 1) (the arrangement interval Δx of the respective speakers 501) and the above condition 2) (the number N of speakers 501 included in the speaker array SA) to be substituted into Formula (7).

Further, the filter generation unit 301 sets a distance Y2 from the center of the speaker array SA to the reproduction line BL2 in the direction forming the deflection angle θ2 with the y-axis direction as the above condition 3) (the distance yref from the speaker array SA to the control line CL in the y-axis direction) to be substituted into Formula (7). Furthermore, the filter generation unit 301 sets the width L2 of the reproduction line BL2 to the above condition 4) (the width lb of the reproduction line BL) to be substituted into Formula (7).

Then, the filter generation unit 301 generates the mask control filter F(x, 0, ω) by performing calculation of substituting the above conditions 1) to 4) into Formula (7).

Next, the processing unit 302 performs the masking sound processing using the masking sound signal generated in step S20. Specifically, in the masking sound processing, the processing unit 302 generates the drive signal D by convolving the masking sound signal output in step S20 with the mask control filter F(x, 0, ω) generated in step S21 (step S22).

More specifically, in step S22, the processing unit 302 generates the drive signal D(x, 0,2πf)(D(x, 0,2πf)=S(2πf)F(x, 0,2πf)) obtained by convoluting the mask control filter F(x, 0,2πf) generated in step S21 with the audio signal S(2πf) indicating the masking sound.

Next, the directional angle control unit 303 performs emission angle control processing of adjusting the phase of the masking sound to be output from each of the plurality of speakers 501 in such a manner that the sound beam of the masking sound is emitted to the non-reproduction area avoiding the listener (step S23).

Specifically, in step S23, in the emission angle control processing, as illustrated in FIG. 10, the directional angle control unit 303 adjusts the phase of the masking sound to be output from each of the plurality of speakers 501 so that the emitting direction of the sound beam BM2 of the masking sound is deflected from the y-axis direction by the deflection angle θ2.

More specifically, in step S23, the directional angle control unit 303 adjusts the timing to start driving each speaker 501 by adjusting the phase of the drive signal D(x, 0,2πf) generated in step S22 as described above. Thus, the directional angle control unit 303 adjusts the phase of the masking sound to be output from each of the plurality of speakers 501.

Next, the synthesis unit 304 transmits, to the reproduction unit 500, a drive signal obtained by synthesizing the drive signal D generated in step S14 and having the phase adjusted in step S15 or having the phase not adjusted in step S15 with the drive signal D generated in step S22 and having the phase adjusted in step S23. In response to this, the reproduction unit 500 drives each of the plurality of speakers 501 by the received drive signal D. Thus, the reproduction unit 500 causes each of the plurality of speakers 501 to output the masking sound indicated by the masking sound signal generated in step S20 together with the reproduced sound indicated by the reproduced sound signal received in step S13 (step S24).

Until the input of the reproduced sound signal in the audio input unit 200 is ended and the output of the reproduced sound signal from the audio input unit 200 to the processing unit 300 is ended (NO in step S25), the processing in and after step S17 is repeated. When the output of the reproduced sound signal from the audio input unit 200 to the processing unit 300 is ended (YES in step S25), the reproduction unit 500 ends the output of the reproduced sound signal and the masking sound signal.

According to the present embodiment, the masking sound having a higher sound pressure than the leakage sound is generated. Then, the directivity of the masking sound to be output from each of the plurality of speakers 501 is adjusted in such a manner that the sound beam BM2 of the masking sound is emitted to the reproduction line L2 in the non-reproduction area while avoiding the passenger 92. Then, the masking sound with the adjusted directivity is output from each of the plurality of speakers 501.

Thus, the sound beam BM2 of the masking sound having the sound pressure higher than that of the leakage sound is emitted to the non-reproduction area while avoiding the passenger 92. Therefore, the reproduced sound leaking to the non-reproduction area can be masked by the masking sound, and the masking sound can be avoided from being heard by the passenger 92.

Modified Embodiment

Although the embodiments of the present disclosure have been described above, a subject or a device that performs each processing is not limited to those described in the above embodiments. For example, modified embodiments described below may be used.

(1) In a case where the sound pressure of the noise indicated by the noise signal acquired in step S19 (FIG. 9) is equal to or lower than a predetermined lower limit level, steps S20 to S24 (FIG. 9) may be omitted. Thus, in a case where the sound pressure of the noise indicated by the noise signal acquired in step S19 (FIG. 9) is equal to or lower than the predetermined lower limit level, the generation of the masking sound may be stopped, and the output of the masking sound may be stopped. According to the present aspect, it is possible to eliminate the sense of discomfort caused by hearing the masking sound in the silent non-reproduction area where only the noise equal to or lower than the lower limit level can be heard.

(2) In a case where the reproduced sound signal input to the audio input unit 200 is an audio signal indicating sound recorded on a storage medium such as a CD or a DVD, the processing unit 300 may generate masking sound to be output after a predetermined time (for example, 10 seconds) in advance. Specifically, this configuration can be implemented as follows.

The audio output device starts processing of outputting the audio signal of the reproduced sound recorded in the storage medium to the audio input unit 200. Thereafter, in parallel with the process, the audio output device performs subsequent output processing of outputting, to the audio input unit 200, an audio signal (hereinafter, a subsequent reproduced sound signal) indicating sound (hereinafter, a subsequent reproduced sound) to be reproduced after a predetermined time in the reproduced sound.

In response to this, upon receiving the input of the subsequent reproduced sound signal output in the subsequent output processing, the audio input unit 200 transmits the subsequent reproduced sound signal to the processing unit 300 as in step S13 (FIG. 9). Thereafter, the sound collection unit 400 and the processing unit 300 perform processing similar to steps S17 to S20 (FIG. 9) using the subsequent reproduced sound signal received from the audio input unit 200 as the reproduced sound signal.

That is, in the processing similar to step S17, the sound collection unit 400 collects an environmental sound and outputs an environmental sound signal indicating the collected environmental sound to the processing unit 300.

In the processing similar to step S18, the leakage sound acquisition unit 311 acquires a signal obtained by convolving the subsequent reproduced sound signal input from the audio input unit 200 with a predetermined transfer function of sound from an arrangement position of the reproduction unit 500 to an arrangement position of the sound collection unit 400 as an audio signal (hereinafter, a predicted leakage sound signal) indicating the subsequent reproduced sound predicted to leak (hereinafter, a predicted leakage sound) to the non-reproduction area.

In the processing similar to step S19, the noise acquisition unit 312 acquires the noise signal by subtracting (removing) the predicted leakage sound signal from the environmental sound signal output in the processing similar to step S17.

In the processing similar to step S20, the processing unit 300 generates the masking sound signal indicating the masking sound having a sound pressure higher than that of the predicted leakage sound based on the frequency characteristics of the sound pressures of the noise in the non-reproduction area indicated by the noise signal acquired in step S19 and the predicted leakage sound indicated by the predicted leakage sound signal acquired in step S18.

According to the present aspect, after the predetermined time has elapsed since the input of the reproduced sound is received in the audio input unit 200, the processing of steps S17 to S20 is omitted, the directivity of the masking sound generated in advance is adjusted, and the masking sound can be output. Thus, the processing load applied to the processing unit 300 can be reduced.

(3) The processing unit 300 may adjust the directivity of the masking sound in such a manner that the sound beam of the masking sound is emitted from the speaker 501 farther from the listener as the speaker array SA is longer. Specifically, this configuration can be implemented as follows.

Figure 11:
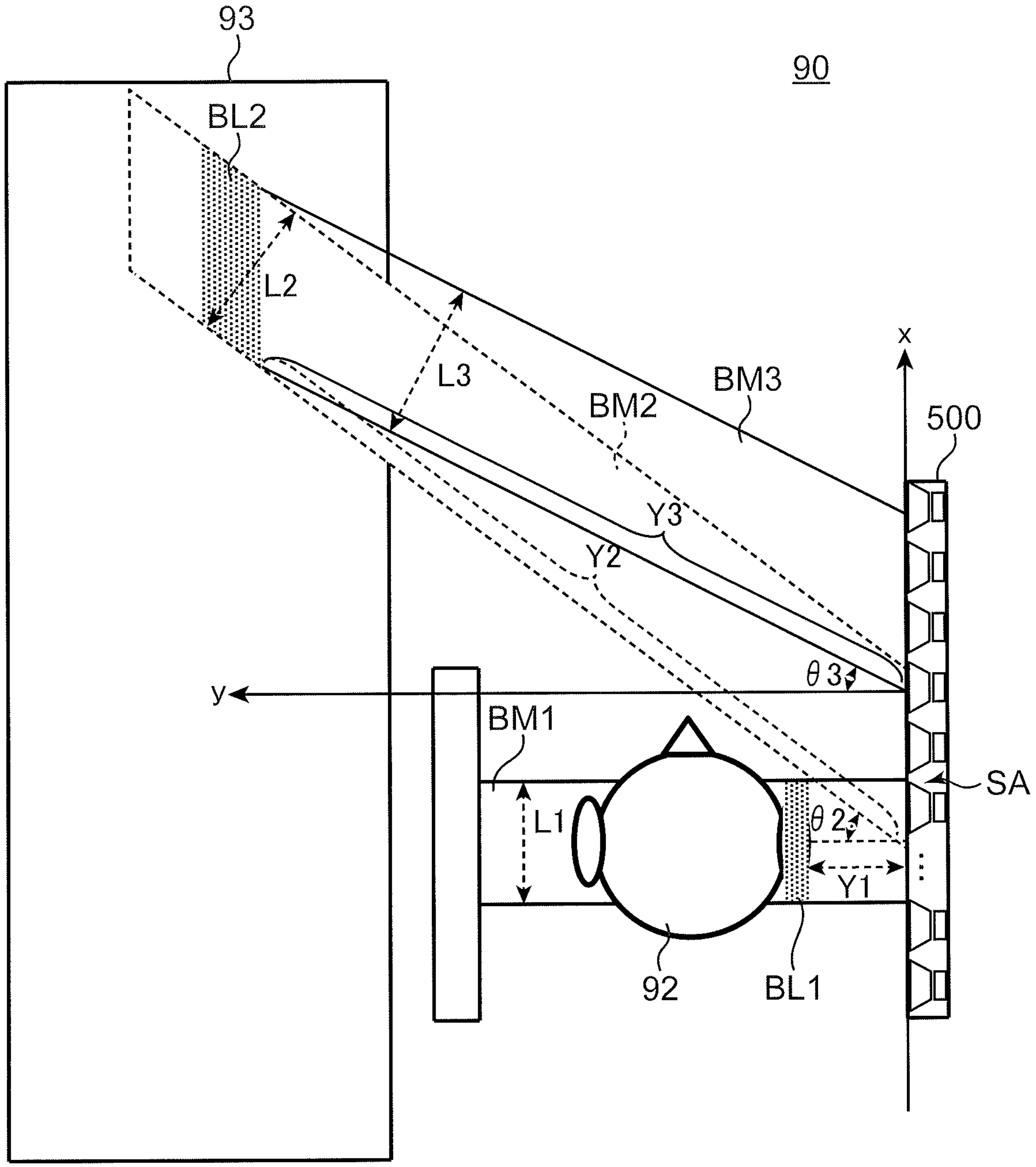
FIG. 11 is a diagram illustrating another adjustment example of the directivity of the masking sound.

FIG. 11 is a diagram illustrating another adjustment example of the directivity of the masking sound. As illustrated in FIG. 11, in step S21 (FIG. 9), the filter generation unit 301 generates the mask control filter F(x, 0, ω) for adjusting the directivity of the masking sound on the assumption that the y-axis is located farther from the passenger 92 who is the listener as the speaker array SA is longer.

More specifically, the filter generation unit 301 acquires the arrangement interval Δx of the respective speakers 501 and the number N of speakers 501 included in the speaker array SA, which are stored in advance in the ROM or the like. The filter generation unit 301 sets them as the above condition 1) (the arrangement interval Δx of the respective speakers 501) and the above condition 2) (the number N of speakers 501 included in the speaker array SA) to be substituted into Formula (7).

Further, as illustrated in FIG. 11, the filter generation unit 301 sets a distance Y3 from the origin at which the x-axis and the y-axis intersect to the reproduction line BL2 as the above condition 3) (the distance yref from the speaker array SA to the control line CL in the y-axis direction) to be substituted into Formula (7). Further, the filter generation unit 301 sets the width L3 of the reproduction line BL2 to the above condition 4) (the width lb of the reproduction line BL) to be substituted into Formula (7). Then, the filter generation unit 301 generates the mask control filter F(x, 0, ω) by performing calculation of substituting the above conditions 1) to 4) into Formula (7).

In the emission angle control processing in step S23 (FIG. 9), as illustrated in FIG. 11, the directional angle control unit 303 adjusts the phase of the masking sound to be output from each of the plurality of speakers 501 so that the sound beam BM3 of the masking sound is emitted to the reproduction line BL2 while avoiding the passenger 92 who is the listener.

Specifically, the directional angle control unit 303 adjusts the phase of the masking sound to be output from each of the plurality of speakers 501 so that the emitting direction of the sound beam BM3 of the masking sound is deflected from the y-axis direction by the deflection angle θ3.

According to the present aspect, the deflection angle θ of the sound beam BM of the masking sound can be smaller as the speaker array SA is longer.

Note that each processing in the above-described embodiment and modified embodiment may be performed by a processor or the like incorporated in a specific device (hereinafter, a local apparatus) included in the area reproduction system 1. In addition, the processing may be performed by a cloud server or the like provided in a place different from the local device. Further, each processing described in the present disclosure may be shared and performed by information cooperation between the local device and the cloud server.

INDUSTRIAL APPLICABILITY

The present disclosure can be used to control a sound wave reproduced from a speaker array. Further, the area reproduction system to which the present disclosure is applied has industrial applicability such as a voice announcement system and an AV system in an aircraft, a train, or the like.

The invention claimed is:

1. An area reproduction system, comprising:

a reproduction unit including a speaker array in which a plurality of speakers is arranged side by side;

an audio input unit that receives an input of a reproduced sound to be listened by a listener;

a sound collection unit that collects an environmental sound in a non-reproduction area different from a reproduction area in which a sound beam of the reproduced sound is emitted;

an acquisition unit that acquires a noise in the non-reproduction area included in the environmental sound and a leakage sound that is the reproduced sound leaking to the non-reproduction area;

a generation unit that generates a masking sound having a sound pressure higher than a sound pressure of the leakage sound on a basis of frequency characteristics of sound pressures of the noise and the leakage sound; and a directivity control unit that adjusts directivity of the masking sound to be output from each of the plurality of speakers in such a manner that a sound beam of the masking sound is emitted to the non-reproduction area while avoiding the listener, wherein the reproduction unit causes each of the plurality of speakers to output the masking sound with adjusted directivity, and the directivity control unit adjusts the directivity of the masking sound in such a manner that a sound beam of the masking sound is mainly emitted from a speaker far from the listener.

2. The area reproduction system according to claim 1, wherein the generation unit generates, as the masking sound, a sound obtained by adjusting a sound pressure of the noise or a sound acquired in advance to be higher than a sound pressure of the leakage sound at each of a plurality of frequencies.

3. The area reproduction system according to claim 1, wherein in a case where the sound pressure of the noise is equal to or lower than a predetermined lower limit level, the generation unit stops generating the masking sound, and the reproduction unit stops outputting the masking sound.

4. The area reproduction system according to claim 1, wherein in a case where the reproduced sound is a recorded sound, the acquisition unit acquires the noise and a predicted leakage sound that is the reproduced sound predicted to leak to the non-reproduction area after a predetermined time, and the generation unit generates a sound having a sound pressure higher than a sound pressure of the predicted leakage sound as the masking sound to be output after the predetermined time on a basis of frequency characteristics of sound pressures of the noise and the predicted leakage sound.

5. The area reproduction system according to claim 1, wherein when it is detected that a sudden sound in which a sound pressure instantaneously increases is included in the noise, the generation unit removes the sudden sound from the noise, and then generates the masking sound on a basis of frequency characteristics of sound pressures of the noise from which the sudden sound has been removed and the leakage sound.

6. The area reproduction system according to claim 1, wherein the directivity control unit adjusts a width and an emitting direction of the sound beam in such a manner that the sound beam of the masking sound avoids a head position of the listener.

7. The area reproduction system according to claim 6, further comprising:

a sensor that acquires information regarding a head position of the listener, wherein the directivity control unit specifies the head position of the listener on a basis of the information regarding the head position of the listener acquired by the sensor.

8. The area reproduction system according to claim 1, wherein the acquisition unit acquires, as the leakage sound, a sound obtained by convolving the reproduced sound received by the audio input unit with a predetermined transfer function of sound from an arrangement position of the reproduction unit to an arrangement position of the sound collection unit, and acquires, as the noise, a sound obtained by removing the acquired leakage sound from the environmental sound.

9. An area reproduction method executed by a computer of an area reproduction system including a speaker array in which a plurality of speakers is arranged side by side, the area reproduction method comprising:

by the computer, receiving an input of a reproduced sound to be listened by a listener;

collecting an environmental sound in a non-reproduction area different from a reproduction area in which a sound beam of the reproduced sound is emitted;

acquiring a noise in the non-reproduction area included in the environmental sound and a leakage sound that is the reproduced sound leaking to the non-reproduction area;

generating a masking sound having a sound pressure higher than a sound pressure of the leakage sound on a basis of frequency characteristics of sound pressures of the noise and the leakage sound;

adjusting directivity of the masking sound to be output from each of the plurality of speakers in such a manner that a sound beam of the masking sound is emitted to the non- reproduction area while avoiding the listener; and causing each of the plurality of speakers to output the masking sound with adjusted directivity, wherein in the adjustment, the directivity of the masking sound is adjusted in such a manner that a sound beam of the masking sound is mainly emitted from a speaker far from the listener.

10. An area reproduction system, comprising:

a reproduction unit including a speaker array in which a plurality of speakers is arranged side by side;

an audio input unit that receives an input of a reproduced sound to be listened by a listener;

a sound collection unit that collects an environmental sound in a non-reproduction area different from a reproduction area in which a sound beam of the reproduced sound is emitted;

an acquisition unit that acquires a noise in the non-reproduction area included in the environmental sound and a leakage sound that is the reproduced sound leaking to the non-reproduction area;

a generation unit that generates a masking sound having a sound pressure higher than a sound pressure of the leakage sound on a basis of frequency characteristics of sound pressures of the noise and the leakage sound; and a directivity control unit that adjusts directivity of the masking sound to be output from each of the plurality of speakers in such a manner that a sound beam of the masking sound is emitted to the non-reproduction area while avoiding the listener, wherein the reproduction unit causes each of the plurality of speakers to output the masking sound with adjusted directivity, and in a case where the sound pressure of the noise is equal to or lower than a predetermined lower limit level, the generation unit stops generating the masking sound, and the reproduction unit stops outputting the masking sound.

11. The area reproduction system according to claim 10, wherein the directivity control unit adjusts the directivity of the masking sound in such a manner that a sound beam of the masking sound is emitted from a speaker farther from the listener as the speaker array is longer.

12. An area reproduction method executed by a computer of an area reproduction system including a speaker array in which a plurality of speakers is arranged side by side, the area reproduction method comprising:

by the computer, receiving an input of a reproduced sound to be listened by a listener;

collecting an environmental sound in a non-reproduction area different from a reproduction area in which a sound beam of the reproduced sound is emitted;

acquiring a noise in the non-reproduction area included in the environmental sound and a leakage sound that is the reproduced sound leaking to the non-reproduction area;

generating a masking sound having a sound pressure higher than a sound pressure of the leakage sound on a basis of frequency characteristics of sound pressures of the noise and the leakage sound;

adjusting directivity of the masking sound to be output from each of the plurality of speakers in such a manner that a sound beam of the masking sound is emitted to the non-reproduction area while avoiding the listener;

causing each of the plurality of speakers to output the masking sound with adjusted directivity; and stopping the generation and the output of the masking sound in a case where the sound pressure of the noise is equal to or lower than a predetermined lower limit level.

* * * * *